United States Patent [19]

Kumagai

[11] 4,222,435
[45] Sep. 16, 1980

[54] AIR CONDITIONING DISPLAY SYSTEM FOR VEHICLES

[75] Inventor: Naotake Kumagai, Aichiken, Japan

[73] Assignee: Mitsubishi Jidosha Kogyo Kabushiki Kaisha, Tokyo, Japan

[21] Appl. No.: 895,610

[22] Filed: Apr. 12, 1978

[30] Foreign Application Priority Data

Apr. 19, 1977 [JP] Japan .............................. 52/49353[U]
Mar. 3, 1978 [JP] Japan ................................ 53/24684

[51] Int. Cl.³ .................... F28F 27/00; B60H 1/00; B60Q 11/00; G08B 5/36
[52] U.S. Cl. ................................. 165/11 R; 165/43; 73/432 AD; 237/12.3 B; 340/52 F; 340/525
[58] Field of Search .............. 165/11, 42, 43; 62/126; 236/94; 340/52 F, 524, 525, 79, 286 M; 73/432 AD; 123/41.15; 237/12.3 B

[56] References Cited

U.S. PATENT DOCUMENTS

| | | | |
|---|---|---|---|
| 3,626,370 | 12/1971 | Stubbs | 340/524 X |
| 3,916,988 | 11/1975 | Matsuda | 165/42 |
| 3,939,456 | 2/1976 | Curtis et al. | 236/94 X |
| 3,975,708 | 8/1976 | Lusk et al. | 340/525 X |
| 4,016,534 | 4/1977 | Kobayashi et al. | 340/52 F |
| 4,025,896 | 5/1977 | Hintze et al. | 340/79 X |
| 4,035,764 | 6/1977 | Fujinami et al. | 340/52 F |
| 4,038,061 | 7/1977 | Anderson | 62/126 |
| 4,109,235 | 8/1978 | Bouthors | 340/52 F |

FOREIGN PATENT DOCUMENTS 2642506 1/1978 Fed. Rep. of Germany ......... 340/52 F

OTHER PUBLICATIONS

"Automotive Solid State Displays", Bischoff, from Automobiltechnische Zeitschrift.

*Primary Examiner*—Albert W. Davis
*Assistant Examiner*—Margaret A. Focarino
*Attorney, Agent, or Firm*—Oldham, Oldham, Hudak & Weber

[57] ABSTRACT

An air conditioning display system for a vehicle comprising a vehicle's air conditioner proper including at least a plurality of air intake ducts, a plurality of air discharge ducts, a plurality of dampers for closing and opening the ducts, a fan unit, and a heat exchanger, air conditioner actuating means for actuating at least the dampers and the fan unit and controlling supply of heat medium to the heat exchanger, and a display device including at least temperature sensing means for sensing a temperature at the heat exchanger. Display means is disposed in the air conditioner actuating means to provide display corresponding to the temperature at the heat exchanger in response to a signal from the temperature sensing means, so that the occupant can easily visually confirm whether or not the air conditioner is in an effective condition.

26 Claims, 44 Drawing Figures

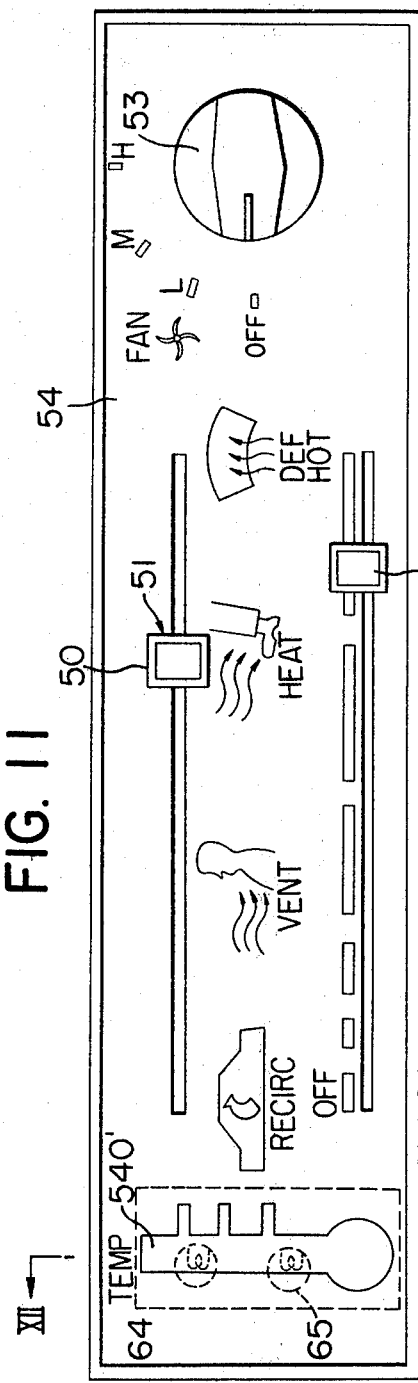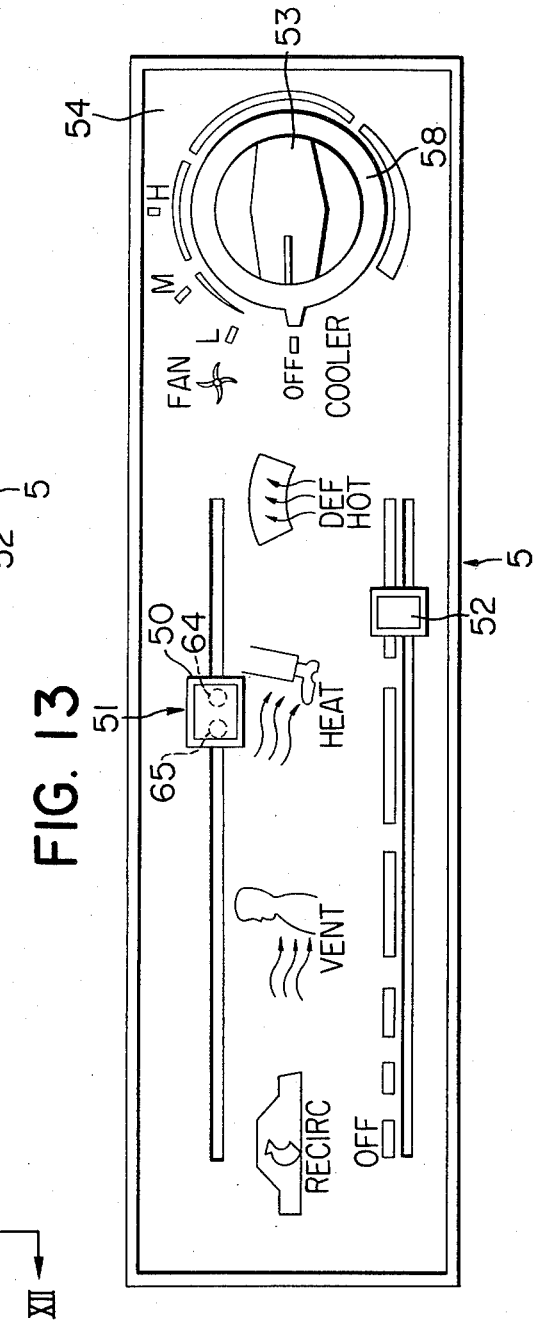

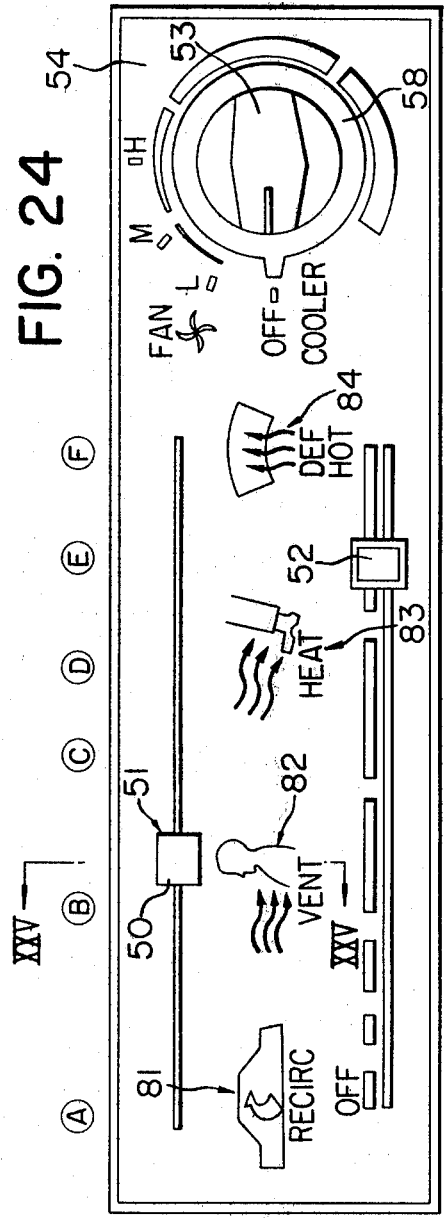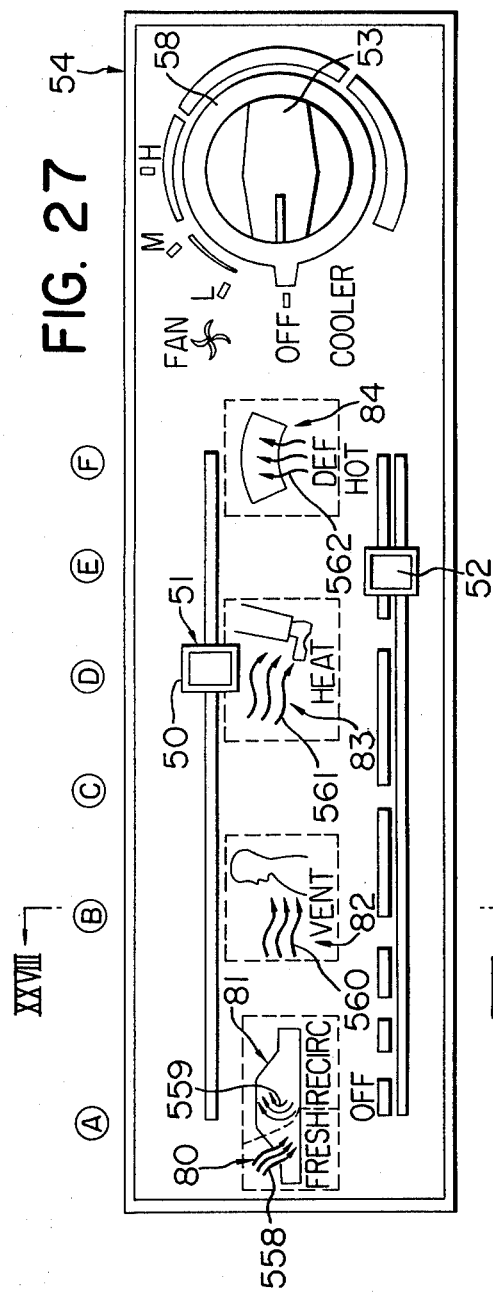

AIR CONDITIONING DISPLAY SYSTEM FOR VEHICLES

BACKGROUND OF THE INVENTION

This invention relates to an air conditioning display system especially suitable for use with air conditioning devices of an automotive vehicle or the like which is equipped with a heater or a cooler.

Vehicles such as an automotive vehicle are equipped with a heater or cooler for the air conditioning system of the vehicle compartment. The above mentioned heater conducts part of the hot engine cooling water to the heater core, and external air which is introduced by ram effect or by fan passes through the heater core and is discharged into the vehicle compartment. The external air is heated by said heater core. In the case of the cooler, refrigerant gas is compressed to a high temperature and high pressure by the gas compressor driven by the engine. This compressed gas becomes a liquid coolant in a condenser, part of which is stored in the liquid storage tank. The remainder is introduced under pressure to the expansion valve where it is suddenly decompressed, gassified and cooled. This cooled refrigerant gas is conducted to the cooler core or evaporator and air which has been cooled by the cooler core is introduced into the compartment.

However, in the case of the heater, when the car is first started, the temperature of the engine cooling water is usually approximately the same as the ambient exterior temperature. Therefore, when the fan is switched on, not warm air but unexpectedly cold air would be introduced into the vehicle compartment. Especially in winter, the discomport experienced by the occupants such as the person who operates the heater due to cold air is extreme. Also, in the case of the cooler, when the car is first started or the compressor is first driven, sufficiently cooled air is not obtainable. Especially in summer, when lukewarm air is introduced into the vehicle compartment, it is unpleasant for the operator who was expecting cool air. Such discomfort occurs when the operator switches on the fan of the heater or cooler before the heater core is sufficiently warm or the cooler core is sufficiently cool.

SUMMARY OF THE INVENTION

In order to solve such problems, it is a primary object of this invention to provide a novel air conditioning display system for a vehicle, in which a temperature sensor senses the temperature of the heat medium which regulates the air in the vehicle compartment, and a display corresponding to this temperature is shown on the air conditioner actuator. By visually checking the air conditioner actuator the occupant can easily tell whether the temperature of the heat medium is suitable for regulating the air in the vehicle compartment.

BRIEF DESCRIPTION OF THE DRAWINGS

This invention will be explained by way of example with reference to the accompanying drawings in which;

FIG. 11 is an enlarged front elevational view of a second embodiment of the present invention, FIG. 13 is an enlarged front elevational view of a third embodiment of the present invention, FIG. 24 is an enlarged front elevational view of a eighth embodiment of the present invention, FIG. 27 is an enlarged front elevational view of a ninth embodiment of the present invention.

DESCRIPTION OF THE PREFERRED EMBODIMENTS

Figure 1:
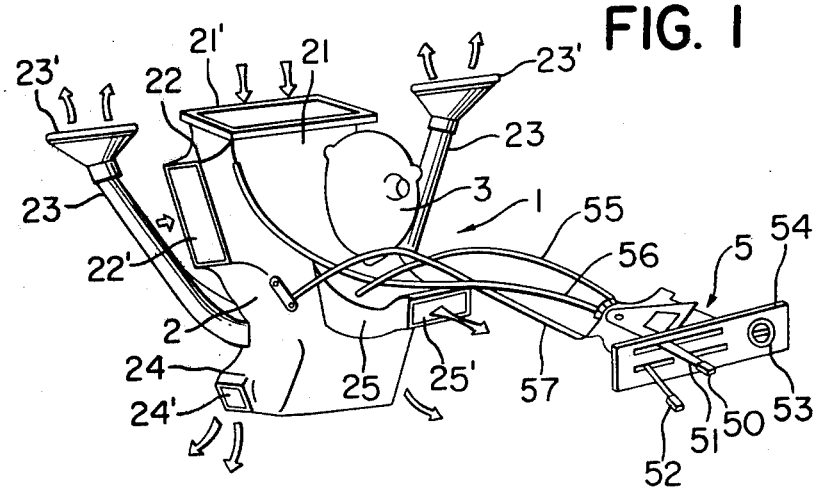
FIG. 1 is a schematic perspective view of a first embodiment of the air conditioning display system according to the present invention.

A first embodiment of the present invention will be described with reference to FIGS. 1 to 10. A venicle's air conditioner proper 1 includes an air duct 2, a fan unit 3, and a heater core 4. One end of the air duct 2 is branched into an external air intake duct 21 having an inlet 21' and a compartment air intake duct 22 having an inlet 22'. The other end of the air duct 2 is also branched into a defroster air discharge duct 23 having an outlet 23' and an air discharge duct 24 having an outlet 24' directing air toward the foot portions of occupants. A ventilation air discharge duct 25 having an outlet 25' from an intermediate portion of the air duct 2 for directing air toward the upper half of the body of an occupant sitting on the front seat. A first damper 26 is disposed between the external air intake duct 21 and the compartment air intake duct 22. A second damper 27 is disposed between the defroster air discharge duct 23 and the foot air discharge duct 24. A third damper 28 is disposed between the ventilation air discharge duct 25 and the air duct 2. The fan unit 3 is disposed in the air duct 2 between the first damper 26 and the third damper 28, while the heater core 4 is disposed in the air duct 2 between the third damper 28 and the second damper 27 to be supplied with engine cooling water. A valve 40 regulates the amount of engine cooling water supplied to the heater core 4.

Figure 2:
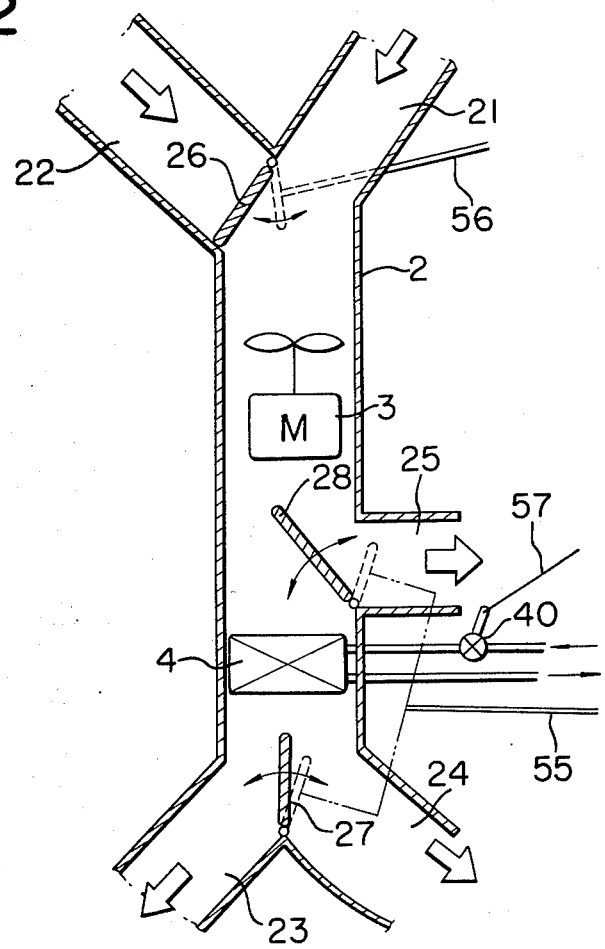
FIG. 2 illustrates part of an air conditioner proper shown in FIG. 1.
Figure 3:
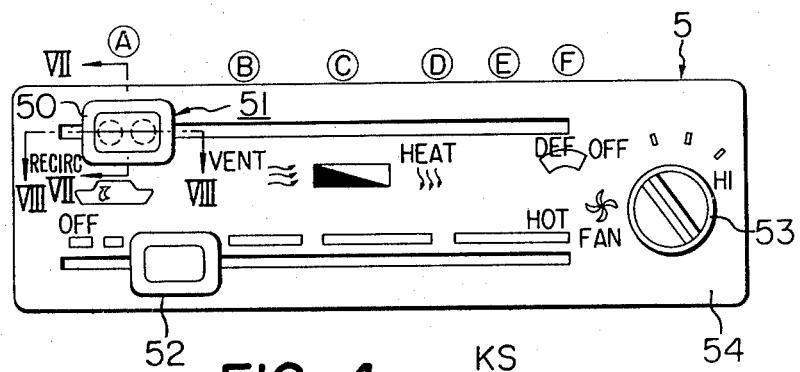
FIG. 3 is an enlarged front elevational view of an air conditioner actuator shown in FIG. 1.

A conventional air conditioner actuator 5 is mounted adjacent to the instrument panel of the vehicle and includes a function lever 51, a heater lever 52 which regulates the temperature and a fan switch 53. The function lever 51 is pivotally supported on the body of the air conditioner actuator by a pin (not shown) and rotatable by moving a knob 50 provided on the forward end of the function lever 51 in the longitudinal direction of the actuator panel 54. The function lever 51 is operatively connected with cables 55 and 56. The cable 55 is connected with the second and third dampers 27 and 28 by a link mechanism. The cable 56 is connected with the first damper 26. When the function lever 51 is moved to a position A labeled "RECIRC" on the actuator panel 54, as shown in FIG. 3, the first damper 26 closes the external air intake duct 21 and opens the compartment air intake duct 22, and the third damper 28 closes the air duct 2 and opens the ventilation air discharge duct 25. When the function lever 51 is moved to another position B labeled "VENT" on the panel 54, the first damper 26 opens the external air intake duct 21 and closes the compartment air intake duct 22, while the third damper 28 remains in the position corresponding to the "RECIRC" position labeled A of the lever 51 to discharge external air from the outlet 25' of the ventilation air discharge duct 25. No warm air is discharged from this outlet 25'. When the function lever 51 is moved to another position D labeled "HEAT" on the panel 54, the first damper 26 opens the external air intake duct 21 as in the "VENT" position of the lever 51, while the third damper 28 closes the ventilation air discharge duct 25, and the second damper 27 closes the defroster air discharge duct 23 and opens the foot air discharge duct 24. When the function lever 51 is moved to another position C intermediate the "VENT" position and the "HEAT" position on the panel 54, the third damper 28 is placed in the position shown in FIG. 2, and the air flows out from the ventilation air discharge duct 25 and the foot air discharge duct 24. When the function layer 51 is moved to another position F labeled "DEF", the third damper 28 closes the ventilation air discharge duct 25, and the second damper 27 opens the defroster air discharge duct 23 and closes the foot air discharge duct 24. When the function lever 51 is moved to another position E intermediate the "HEAT" position and the "DEF" position on the panel 54, the second damper 27 is placed in its neutral position as shown in FIG. 2, and the defroster air discharge duct 23 and the foot air discharge duct 24 are opened partly to permit flow of air thereinto.

The heater lever 52 is operatively connected by a cable 57 with the valve 40, and this valve 40 is full closed when the heater lever 52 is moved to the "OFF" position at the left-hand end of its stroke in FIG. 3. As the heater lever 52 is moved toward the right in FIG. 3 from the "OFF" position, the opening of the valve 40 is gradually increased until finally the valve 40 is full opened when the heater lever 52 reaches the "HOT" position at the right-hand end of its stroke in FIG. 3. The fan switch 53, which actuates the fan unit 3, is selectively placed in one of the "OFF", "Lo", "M" and "H" positions.

An air conditioning display device 6 comprises a temperature sensor 61, a heater switch 62, a heater relay 63, a first lamp 64 and a second lamp 65. This temperature sensor 61 is disposed within the water jacket (not shown) of the engine, and one terminal of the sensor is connected to the IG terminal of the ignition key switch K.S. The temperature sensor 61 which is in the form of a thermal reed switch comprises thermoferrites 611 and 611', magnets 612, a reed switch 613 and a magnetic gas 614. Each of the thermoferrites 611 and 611' is a strong magnetic body and loses its magnetism when the surrounding temperature is above Curie temperature for example a desired temperature of 50° C. The reed switch 613 comprises two reeds of strong magnetic bodies, ends of which are enclosed in a glass tube through ends thereof and disposed opposite to each other. The magnets 612 form a source of magnetic flux for opening and closing the reed switch 613. The magnetic gap 614 is formed by brass, air, plastic, etc.

Figure 4:
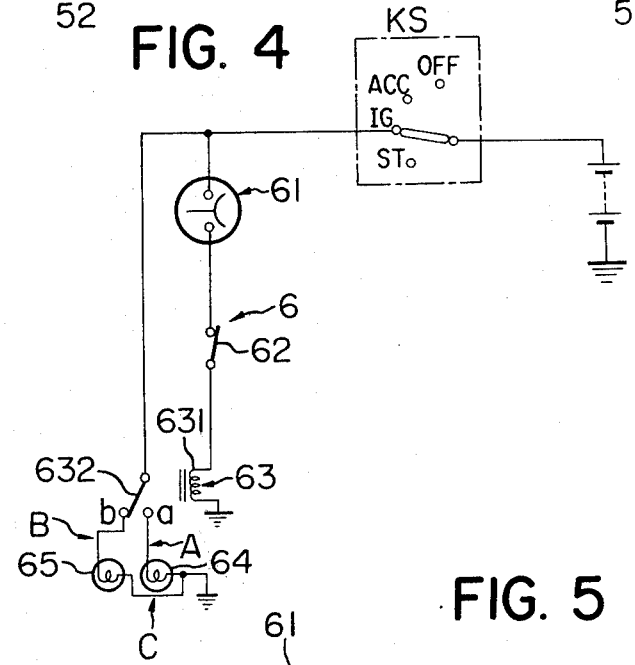
FIG. 4 is a circuit diagram in the first embodiment of this invention.
Figure 5:
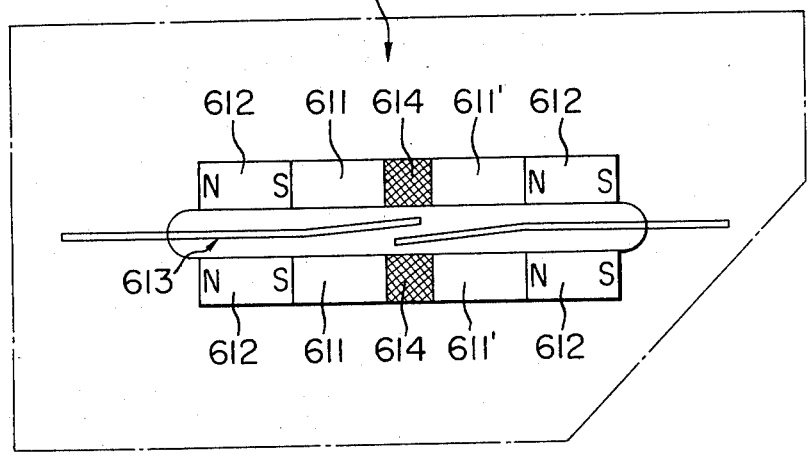
FIG. 5 is a schematic sectional view of a first temperature sensor shown in FIG. 4.
Figure 6:
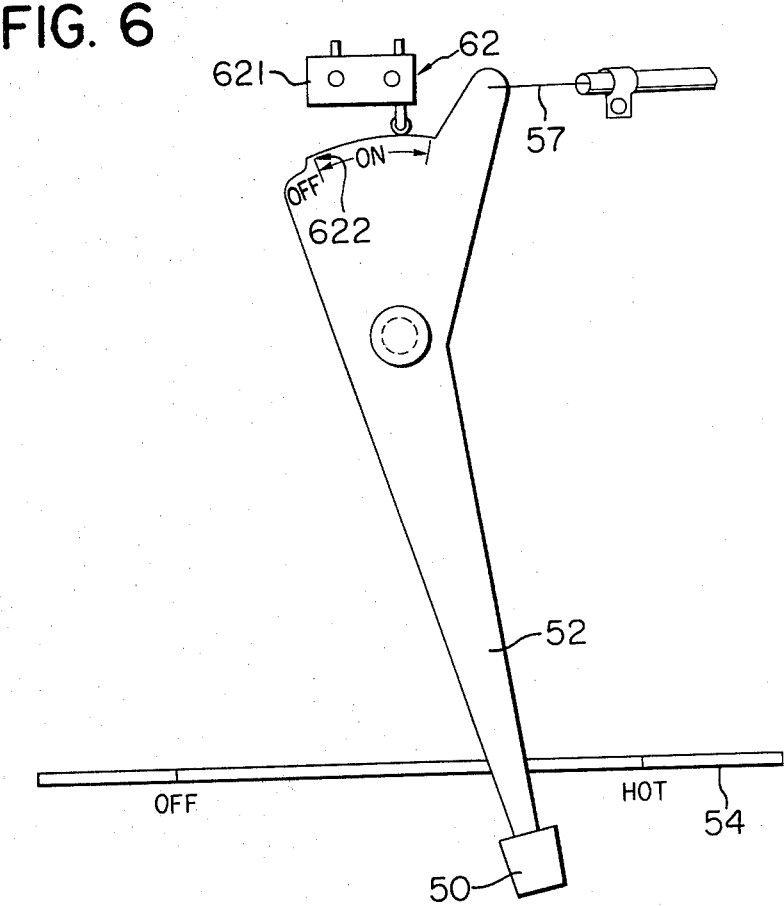
FIG. 6 is a plan view of a heater switch shown in FIG. 4.

The heater switch 62 comprises a microswitch 621 and a cam 622 on the heater lever 52, as shown in FIG. 6. When the heater lever 52 is in the "OFF" position, the microswitch 621 is not in contact with the cam 622 and turned off. When the heater lever 52 is in any position other than "OFF", the microswitch 621 comes into contact with the cam 622 and turned on. As shown in FIG. 4, the heater switch 62 is connected at one terminal with the temperature sensor 61 and at the other terminal with an exciting coil 631 of the heater relay 63. The heater relay 63 comprises the exciting coil 631, a movable arm 632 and contacts a and b. The movable arm 632 is connected with said IG terminal, and is brought into contact with the contact a when the exciting coil 631 is energized and with contact b when deenergized. The first lamp 64 is connected with the contact a of the heater relay 63 and the second lamp 65 is connected with the contact b of the heater relay 63.

Figure 7:
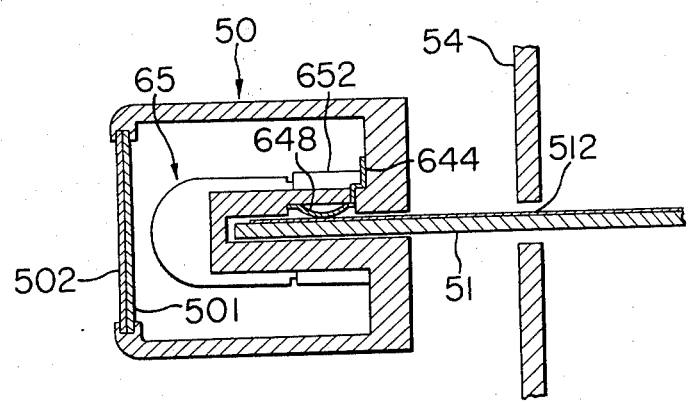
FIG. 7 is a sectional view taken along the line VII—VII in FIG. 3.
Figure 8:
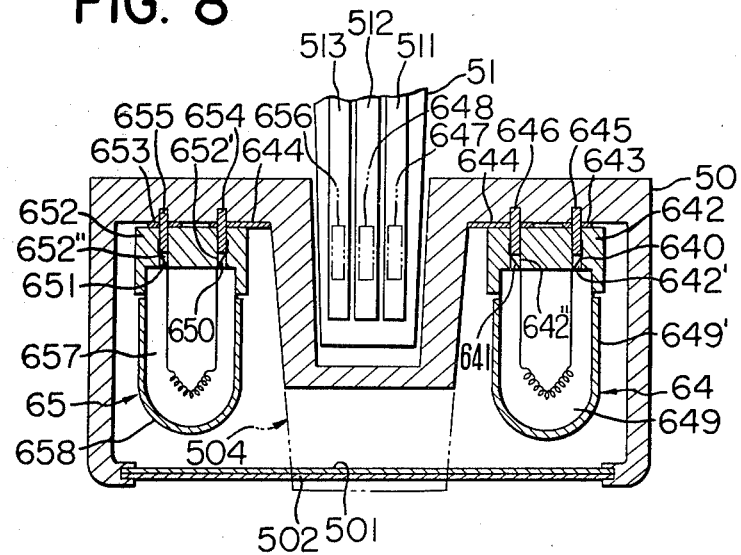
FIG. 8 is a sectional view taken along the line VIII—VIII in FIG. 3.

As shown in FIGS. 7 and 8, the first and second lamps 64 and 65 are disposed in the knob 50 of the function lever 51. The first lamp 64 has leads 640 and 641 made of two bare wires. The leads 640 and 641 are inserted into holes 642' and 642" formed in a rubber base 642. Pins 645 and 646 are implanted in the knob 50 and connected with a first conductive plate 643 and a second conductive plate 644 respectively. The pins 645 and 646 are press-fitted into the holes 642' and 642", so that, through contraction of the base 642, the lead 640 is urged into abutment with the pin 645 in the hole 642' and the lead 641 is urged into abutment with the pin 646 in the hole 642". The first conductive plate 643 is connected to a first brush 647 formed by spring steel and the second conductive plate 644 is connected to a second brush 648 formed by spring steel. As with the first lamp 64, the second lamp 65 comprises leads 650 and 651 made of two bare wires. The leads 650 and 651 are inserted into holes 652' and 652" formed in the rubber base 652. Pins 654 and 655 are implanted in the knob 50 and connected with the second conductive plate 644 and a third conductive plate 653 respectively. The pins 654 and 655 are press-fitted into the holes 652' and 652", so that, through contraction of the base 652, the lead 650 is urged into abutment with the pin 654 in the hole 652' and the lead 651 is urged into abutment with the pin 655 in the hole 652". The third conductive plate 653 is connected to the third brush 656 formed by spring steel. The first to third brushes 647, 648 and 656 are curved and protrude downward to contact with the first to third printed circuit boards 511, 512 and 513 disposed on the upper surface of the function lever 51, as shown in FIG. 7. The first printed circuit board 511 is connected with the contact a of the heater relay 63 through a wire harness, the second printed circuit board 512 is earthed through a wire harness, and the third printed circuit board 513 is connected with the contact b of the heater relay 63 through a wire harness. The knob 50 is provided on the end of the function lever 51 and has an opening on the left side in FIG. 7. A white-colored diffusion plate 501 and a smoked panel 502 adhered thereto are disposed in this opening. The diffusion plate 501 is formed by a glass or acrylic plate, and the smoked panel 502 is formed by an almost black-colored half transparent glass or acrylic plate.

In FIG. 4, a connecting line A which connects between the contact a of the heater relay 63 and the first lamp 64 comprises the pin 645, the first conductive plate 643, the first brush 647 and the first printed circuit board 511. A connecting line B which connects between the contact b of the heater relay 63 and the second lamp 65 comprises the pin 655, the third conductive plate 653, the third brush 656 and the third printed circuit board 513. A connecting line C which connects the first and second lamps 64, 65 with ground comprises the pin 646, pin 654, the second conductive plate 644, the second brush 648 and the second printed circuit board 512. The first lamp 64 is a colorless bulb 649 covered with a transparent red cap 649', and the second lamp 65 is a colorless bulb 657 covered with a transparent blue cap 658.

The operation of the above described embodiment will be explained below.

Firstly, the function lever 51 shown in FIG. 3 is moved to the "HEAT" position and the ignition key switch K.S shown in FIG. 4 is connected to the IG terminal. When the heater lever 52 is moved to the "OFF" position, the heater switch 62 is turned off, so that the exciting coil 631 of the heater relay 63 is not energized and the movable arm 632 is brought into contact with the contact b. Since the ignition key switch K.S is in contact with the IG terminal, the electrical current supplied from the IG terminal passes through the movable arm 632, contact b, connecting line B to the second lamp 65. This second lamp 65 is energized and emits blue light which is diffused by the diffusion plate 501 over the whole area thereof and reaches the smoked panel 502. This light can be visible to the occupants.

Then, when in order to turn on the heater the heater lever 52 is moved from the "OFF" position to the right in FIG. 3 toward the "HOT" position, the valve 40 is opened and engine cooling water is introduced into the heater core 4. By moving the heater lever 52 in this manner, the cam 622 of the heater lever 52 closes the microswitch 621 and turns the heater switch 62 on.

If the temperature of the engine cooling water is less than a predetermined value for example a temperature of 50° C., the temperature sensor 61 is turned off, the heater relay 63 is not actuated and the second lamp 65 is still energized.

When the temperature of the engine cooling water becomes higher than the predetermined value (50° C.), the temperature sensor 61 is turned on. The exciting coil 631 of the heater relay 63 is energized by electrical current from the IG terminal to bring the movable arm 632 into contact with the contact a, so that the first lamp 64 is energized and emits red light which reaches the occupants through the diffusion plate 501 and smoked panel 502.

Figure 9:
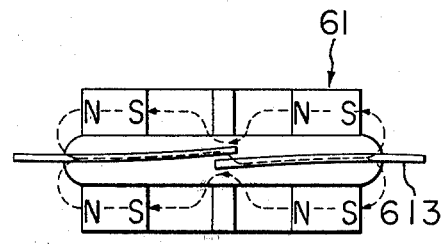
FIG. 9 is an explanatory drawing of the first temperature sensor shown in FIG. 5, showing an operating condition thereof.

In operation of the temperature sensor 61, if the engine cooling water is less than Curie temperature (the predetermined temperature of 50° C.), the thermoferrites 611 and 611' of the temperature sensor 61 become strong magnetic bodies and magnetic flux travels as shown by the broken lines in FIG. 9. The magnetic flux of the magnet 612 and magnetic flux passing through the reed switch 613 counteract each other and the magnetic flux grows weaker at the contact points of the reed switches 613, whereby the reed switch is opened and the temperature sensor 61 is turned off.

Figure 10:
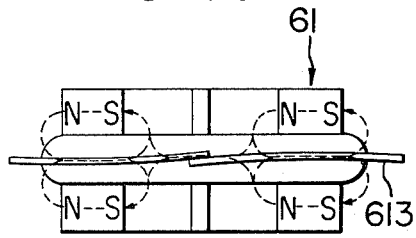
FIG. 10 is an explanatory drawing of the first temperature sensor shown in FIG. 5, showing a different operating condition thereof.

When the engine cooling water temperature becomes higher than Curie temperature (50° C.), the thermoferrites 611 and 611' lose their magnetism and magnetic flux travels as shown by the broken lines in FIG. 10. The magnetic flux of the magnet 612 which counteracts the magnetic flux passing through the reed switch 612 disappears and the magnetic flux at the contact points of the reed switch 613 grows stronger, whereby the reed switch 613 is closed and the temperature sensor 61 is turned on.

Table 1 shows the above lighting modes.

TABLE 1

| Lighting Conditions | | Lamp | |
|---|---|---|---|
| Heater Switch | Temperature Sensor | First Lamp Red | Second Lamp Blue |
| OFF | OFF | X | O |
| OFF | ON | X | O |
| ON | OFF | X | O |
| ON | ON | O | X |

Remarks:
"X" indicates the lamp is not energized.
"O" indicates the lamp is energized.

Thus, when the heater lever 52 is in any position other than the "OFF" position, the occupant can easily determine whether or not the heater would be effective by checking the color of the knob 50.

In the first embodiment described hereinbefore, in case that the heater switch 62 shown in FIG. 4 is omitted, even when the heater lever 52 is not in a position other than "OFF", in other words without relation to the position of the heater lever 52, the first lamp 64 in the knob 50 will light up red when the temperature of the engine cooling water is at or above the predetermined value and the second lamp 65 will light up blue when said temperature is less than the predetermined value. Therefore, even without moving the heater lever 52 to a position other than "OFF", the occupant can easily determine whether or not the heater would be effective.

The first and second lamps 64 and 65 in the first embodiment, may be in the form of a red lamp and blue lamp respectively. Also the first and second lamps 64 and 65 may be in the form of light emitting diodes or liquid crystal. In case liquid crystal is used, an illuminating lamp is necessary.

Moreover, the first and second lamps 64 and 65 in the first embodiment can be disposed in the knob of the heater lever 52.

The first lamp 64 may be one which emits light of warm color (for example, orange or yellow) and the second lamp 65 may be one which emits light of cold color (for example green).

On vehicles which are fitted with the above described system, the water temperature gauge may be omitted.

In the first embodiment, the temperature sensor 61 is disposed in the water jacket of the engine. However, it may be disposed on the surface of the heater core 4 or in the cooling water passageway of the heater core 4.

In the first embodiment, the leads 640, 641, 650 and 651 of the first and second lamps 64 and 65 may be connected directly to the first to third conductive plates 643, 644 and 653.

Figure 12:
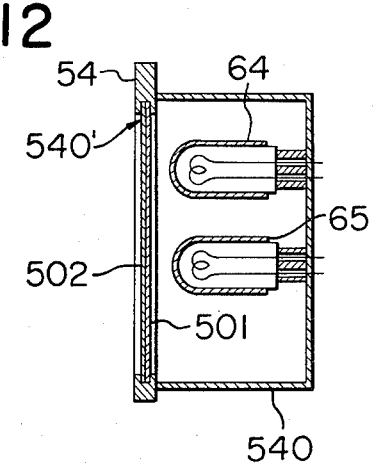
FIG. 12 is a sectional view taken along the line XII—XII in FIG. 11.
Figure 14:
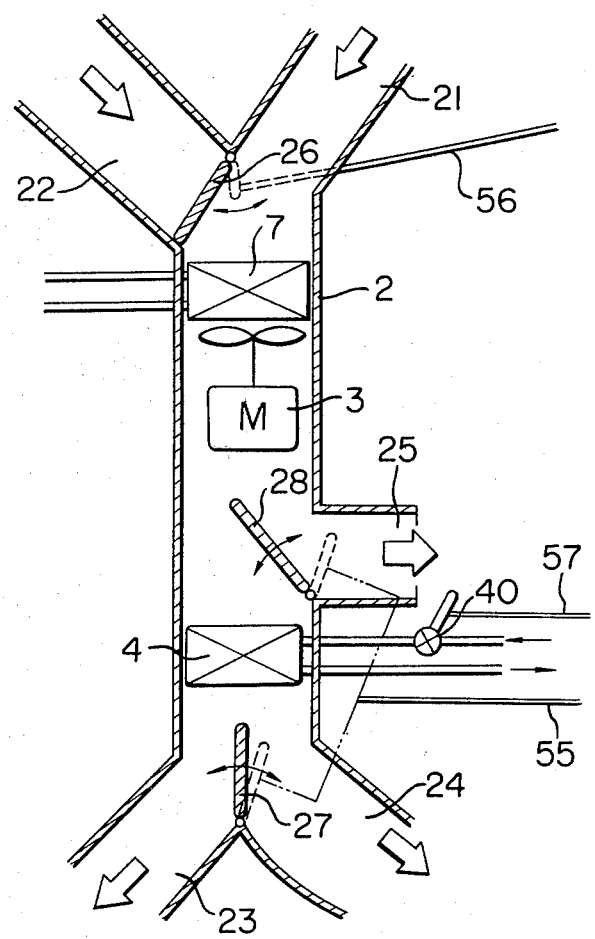
FIG. 14 illustrates part of an air conditioner proper of the third embodiment.
Figure 15:
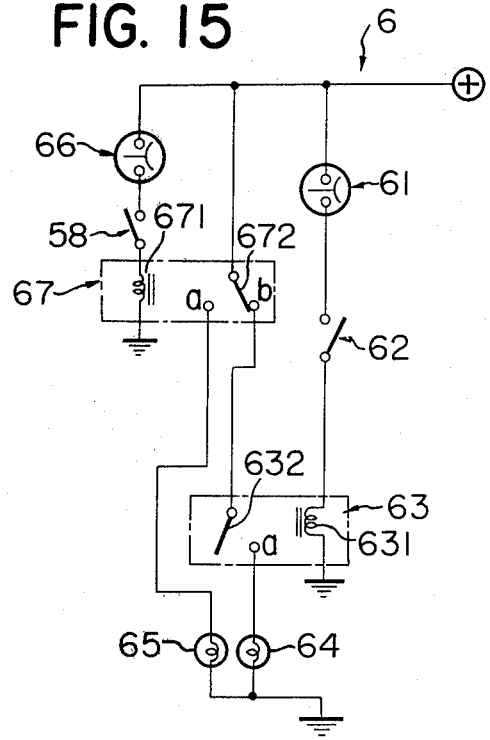
FIG. 15 is a circuit diagram of the third embodiment.

In a second embodiment of the invention shown in FIGS. 11 and 12, the first and second lamps 64 and 65 in the first embodiment are disposed on the actuator panel 54 of the air conditioner actuator 5. The first and second lamps 64 and 65 are disposed in a casing 540 provided on the rear of the actuator panel 54. A cut-out 540' having a shape of a thermometer is formed in the actuator panel 54 on the front surface of the casing 540. The diffusion plate 501 and smoked panel 502 are fitted in this cut-out 540'.

In the third embodiment of the invention shown in FIGS. 13 to 18, a cooler has been added to the air conditioner proper in the first embodiment, and the same numerals are used for parts similar to those in the first embodiment.

Figure 16:
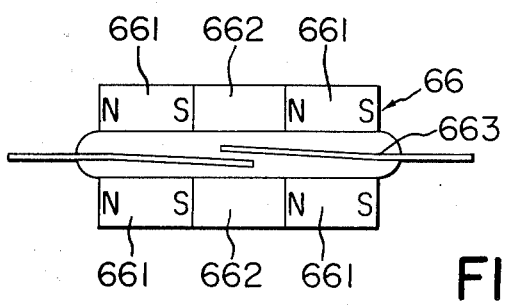
FIG. 16 is a schematic sectional view of a second temperature sensor shown in FIG. 15.
Figure 17:
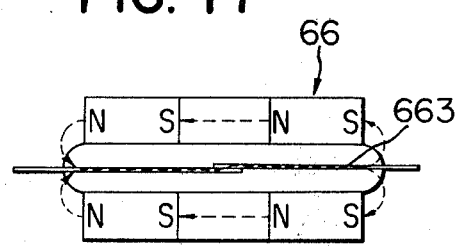
FIG. 17 is an explanatory drawing of the second temperature sensor shown in FIG. 16, showing an operating condition thereof.
Figure 18:
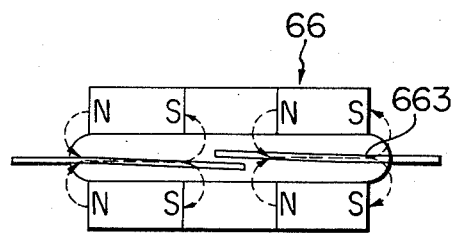
FIG. 18 is an explanatory drawing of the second temperature sensor shown in FIG. 16, showing a different operating condition thereof.

Referring to FIGS. 13 to 18, a cooler core or evaporator 7 is disposed in the air duct 2 between the first damper 26 and the fan unit 3. When the cooler switch 58 mounted on the outer circumference of the heater switch 53 disposed on the actuator panel 54 of the air conditioner actuator 5 is turned on, refrigerant is introduced into the cooler core 7. One terminal of the first temperature sensor 61 is connected with a power source (for example, the IG terminal or the ACC terminal of the ignition key switch, or the battery terminal, etc.), while the other terminal is connected with the exciting coil 631 of the heater relay 63 through the heater switch 62. A second temperature sensor 66 is attached to the surface of the cooler core 7. One terminal of the second temperature sensor 66 is connected with said power source, and the other terminal is connected to an exciting coil 671 of a cooler relay 67 through the cooler switch 58. A movable arm 672 of the cooler relay 67 is connected with said power source, and is brought into contact with a contact a when the exciting coil 671 is energized and brought into contact with contact b when it is deenergized. Said contact a is connected with the second lamp 65 which emits a blue light and said contact b is connected with the movable arm 632 of the heater relay 63. The contact a adapted to contact with the movable arm 632 is connected with the first lamp 64 which emits a red light. Said second temperature sensor 66, as shown in FIG. 16, comprises magnets 661, a thermoferrite 662, a reed switch 663. When the surrounding temperature is less than a predetermined value for example the temperature of less than 10° C., the thermoferrite 662 becomes a strong magnetic body and magnetic flux from the magnets 661 flows in the thermoferrite 662. The magnetic flux flows in a closed loop as shown by the broken line in FIG. 17, so that the magnetic flux is concentrated on the contact points of the reed switch 663. Consequently, the reed switch 663 is closed and the temperature sensor 66 is turned on. When the surrounding temperature becomes higher than the predetermined value (at or above 10° C.), the thermoferrite 662 loses its magnetism and the magnetic flux from each magnet 661 creates the closed loop as shown by the broken lines in FIG. 18. Since magnetic flux does not flow through the contact points of the reed switch 663, the reed switch 663 is opened and the second temperature sensor 66 is turned off.

The operation of the above described third embodiment will be explained hereunder.

Firstly, the heater lever 52 is moved to the "OFF" position, the heater switch 62 is turned off and the cooler switch 58 is turned off. The movable arm 672 of the cooler relay 67 contacts with the contact b. Since the movable arm 632 of the heater relay 63 does not contact with the contact a and the heater relay 63 is open, the first and second lamps 64 and 65 are not energized.

Then, when the heater lever 52 is moved from the "OFF" position toward the "HOT" position as shown in FIG. 13, the heater switch 62 is turned on. If the temperature of the engine cooling water is less than the predetermined value, the first temperature sensor 61 is turned off, and therefore the exciting coil 631 of the heater relay 63 is not energized and the heater relay 63 remains open. The first and second lamps 64 and 65 are not energized. If the temperature of the engine cooling water is at or above the predetermined value, the first temperature sensor 61 is turned on and the exciting soil 631 of the heater relay 63 is energized, so that the movable arm 632 contacts with the contact a. As the electrical current passes through the movable arm 672 of the cooler relay 67 and its contact b and the heater relay 63, the first lamp 64 is energized to illuminate the smoked panel 502 of the knob 50 with red light.

Then, the heater lever 52 is moved to the "OFF" position, the heater switch 62 is turned off, and the cooler switch 58 is turned on. If the temperature of the surface of the cooler core 7 is at or above the predetermined value, the second temperature sensor 66 is turned off and therefore the first and second lamps 64 and 65 are not energized. If said surface temperature is less than the predetermined value, the second temperature sensor 66 is turned on and the exciting coil 671 of the cooler relay 67 is energized. As the movable arm 672 contacts with the contact a, the electrical current passes through the contact a to the second lamp 65. This lamp 65 is energized and illuminates the smoked panel 502 with blue light.

Furthermore, in the above condition, when the heater lever 52 is moved from the "OFF" position toward the "HOT" position the heater switch 62 is turned on, but since the movable arm 672 of the cooler relay 67 remains in contact with the contact a, the first lamp 64 remains unenergized and only the second lamp 65 is energized.

The above lighting modes of lamps 64 and 65 are shown in Table 2.

TABLE 2

| Operating Conditions | | | | Lamp | |
|---|---|---|---|---|---|
| Heater Switch | Cooler Switch | First Temperature Sensor | Second Temperature Sensor | First Lamp Red | Second Lamp Blue |
| OFF | OFF |  | OFF | X | X |
|  |  |  | ON | X | X |
|  |  | OFF | OFF | X | X |
|  |  | ON | ON | X | X |
|  | ON |  | OFF | X | X |
|  |  |  | ON | X | O |
|  |  | ON | OFF | X | X |
|  |  |  | ON | X | O |
| ON | OFF | OFF | OFF | X | X |
|  |  |  | ON | X | X |
|  |  | ON | OFF | O | X |
|  |  |  | ON | O | X |
|  | ON | OFF | OFF | X | X |
|  |  |  | ON | X | O |
|  |  | ON | OFF | O | X |
|  |  |  | ON | X | O |

Remarks:
"X" indicates the lamp is not energized.
"O" indicates the lamp is energized.

Therefore, when the heater lever 52 is moved from the "OFF" position toward the "HOT" position and the engine cooling water is at or higher than the predetermined value, the first lamp 64 is energized to illuminate the smoked panel 502 with red light. When the cooler switch 58 is turned on and the temperature of the surface of the cooler core is less than the predetermined value, the second lamp 65 is energized to illuminate the smoked panel 502 with blue light, whereby the occupant can readily confirm that the heater and the cooler are effective. When these lamps 64 and 65 are not energized, the occupant can avoid discomfort by not actuating the fan unit 3 to introduce air which has not been warmed or air which has not been cooled into the vehicle compartment.

In the third embodiment, the heater switch 62 and cooler switch 58 may be omitted. Also, the first and second lamps 64 and 65 may be disposed on the actuator panel 54. Furthermore, the second lamp 65 may be one which emits green light.

Figure 19:
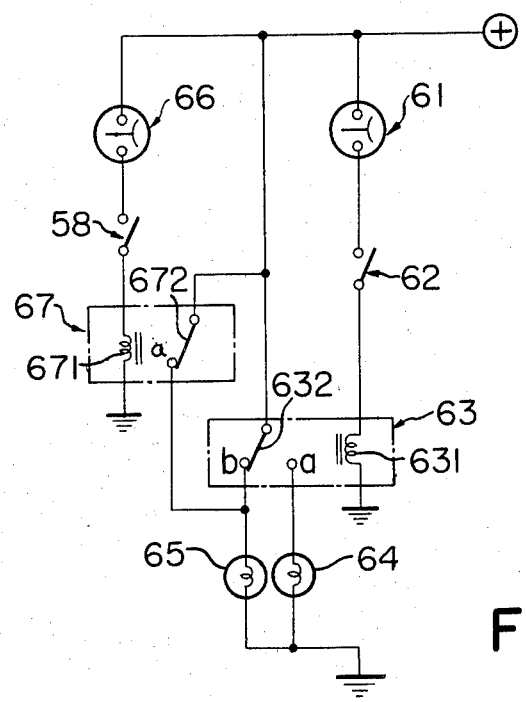
FIG. 19 is a circuit diagram of a fourth embodiment of the present invention.

The fourth embodiment of the invention shown in FIG. 19 is similar to the third embodiment. In this embodiment, when the heater and cooler are respectively in an effective condition in first and second lamps 64 and 65 are both energized at the same time, and moreover even when neither the heater nor the cooler are in an effective condition the second lamp 65 is energized.

Referring to FIG. 19, the movable arm 632 of the heater relay 63 is connected with the power source. The contact a of this relay 63 is connected with the first lamp 64, while the contact b is connected with the second lamp 65. The movable arm 672 of the cooler relay 67 is connected with said power source and the contact a is connected with the second lamp 65.

In operation, the heater lever 52 is moved to a position other than "OFF" and the heater swtich 62 is turned on. When the temperature of the engine cooling water is less than the predetermined value, the movable arm 632 of the heater relay 63 is brought into contact with the contact b and the second lamp 65 is energized to illuminate the smoked panel 502 of the knob 50 with blue light. When the temperature of the engine cooling water is at or above the predetermined value, the heater relay 63 is actuated and the movable arm 632 contacts with the contact a, so that the first lamp 64 is energized and the smoked panel 502 is illuminated with red light.

Then, the heater lever 52 is moved to the "OFF" position and the cooler switch 58 is turned on. If the temperature of the surface of the cooler core 7 is at or less than the predetermined value, the second temperature sensor 66 is turned on and the cooler relay 67 is actuated. As the movable arm 672 contacts with the contact a, the second lamp 65 is energized and the smoked panel 502 is illuminated with blue light.

In this condition, the heater lever 52 is moved to a position other than "OFF" and the heater switch 62 is turned on. If the engine cooling water temperature is at or above the predetermined value, the first temperature sensor 61 is turned on and therefore the movable arm 632 of the heater relay 63 is brought into contact with the contact a to energize the first lamp 64. Since the second lamp 65 continues to be energized, the blue and red lights are mixed and the smoked panel 502 is illuminated with purple light.

All the lighting modes of the above first and second lamps 64 and 65 are shown in Table 3.

TABLE 3

| Operating Conditions | | | | Lamp | |
|---|---|---|---|---|---|
| Heater Switch | Cooler Switch | First temperature Sensor | Second Temperature Sensor | First Lamp Red | Second Lamp Blue |
| OFF | OFF |  | OFF | X | O |
|  |  |  | ON | X | O |
|  |  | OFF | OFF | X | O |
|  |  | ON | ON | X | O |
|  | ON |  | OFF | X | O |
|  |  |  | ON | X | O |
|  |  | ON | OFF | X | O |
|  |  |  | ON | X | O |
| ON | OFF | OFF | OFF | X | O |
|  |  |  | ON | X | O |
|  |  | ON | OFF | O | X |
|  |  |  | ON | O | X |
|  | ON | OFF | OFF | X | O |
|  |  |  | ON | X | O |
|  |  | ON | OFF | O | X |

TABLE 3-continued

| Operating Conditions | | | | Lamp | |
|---|---|---|---|---|---|
| Heater Switch | Cooler Switch | First temperature Sensor | Second Temperature Sensor | First Lamp Red | Second Lamp Blue |
| | | ON | ON | O | O |

Remarks:
"X" indicates the lamp is not energized.
"O" indicates the lamp is energized.

Therefore, when the smoked panel 502 is illuminated with purple light, the occupant can easily determine the temperatures of the cooler core 7 and the heater core 4 are appropriate for operation.

Figure 20:
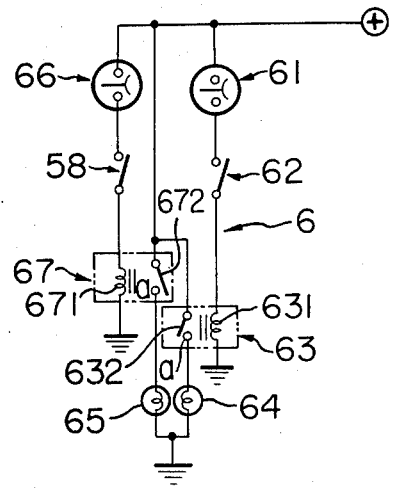
FIG. 20 is a circuit diagram of a fifth embodiment of the present invention.

The fifth embodiment of the invention shown in FIG. 20 is similar to the third embodiment. In this embodiment, the first lamp 64 is energized only when the temperature of the heater core 4 is at or higher than the predetermined value (for example 50° C. or higher), and the second lamp 65 is energized only when the temperature of the cooler core 7 is less than the predetermined value (for example less than 10° C.).

Referring to FIG. 20, the first temperature sensor 61 is connected with the exciting coil 631 of the heater relay 63 through the heater switch 62, the movable arm 632 of the heater relay 63 is connected with the power source and the contact a of this relay 63 is connected with the first lamp 64. The second temperature sensor 66 is connected with the exciting coil 671 of the cooler relay 67 through the cooler switch 58, the movable arm 672 of the cooler relay 67 is connected with the power source and the contact a of this relay 67 is connected with the second lamp 65.

In operation, the heater lever 52 is moved to a position other than "OFF" and the heater switch 62 is turned on. If the temperature of the engine cooling water is at or above the predetermined value, the first temperature sensor 61 is closed and the exciting coil 631 of the heater relay 63 is energized, whereby the movable arm 632 is brought into contact with the contact a to energize the first lamp 64 and the smoked panel 502 is illuminated with red light.

When the cooler switch 58 is turned on and the temperature of the surface of the cooler core 7 is less than the predetermined value, the second temperature sensor 66 is turned on and the exciting coil 671 of the cooler relay 67 is energized. As the movable arm 672 contacts with the contact a, the second lamp 65 is energized and the smoked panel 502 is illuminated with blue light.

In addition, when the heater lever 52 is in a position other than "OFF" and the temperature of the engine cooling water is at or above the predetermined value and when the cooler switch 58 is turned on and the temperature of the surface of the cooler core 7 is less than the predetermined value, the first and second lamps 64 and 65 are energized and the blue and red lights are mixed to illuminate the smoked panel 502 with purple light.

The lighting modes of the above first and second lamps 64 and 65 are shown in Table 4.

TABLE 4

| Operating Conditions | | | | Lamp | |
|---|---|---|---|---|---|
| Heater Switch | Cooler Switch | First Temperature Sensor | Second Temperature Sensor | First Lamp Red | Second Lamp Blue |
| OFF | OFF | OFF | OFF | X | X |
| OFF | OFF | OFF | ON | X | X |
| OFF | OFF | ON | OFF | X | X |
| OFF | OFF | ON | ON | X | X |
| OFF | ON | OFF | OFF | X | X |
| OFF | ON | OFF | ON | X | O |
| OFF | ON | ON | OFF | X | X |
| OFF | ON | ON | ON | X | O |
| ON | OFF | OFF | OFF | X | X |
| ON | OFF | OFF | ON | X | X |
| ON | OFF | ON | OFF | O | X |
| ON | OFF | ON | ON | O | X |
| ON | ON | OFF | OFF | X | X |
| ON | ON | OFF | ON | X | O |
| ON | ON | ON | OFF | O | X |
| ON | ON | ON | ON | O | O |

Remarks:
"X" indicates the lamp is not energized.
"O" indicates the lamp is energized.

Therefore, the occupant can determine that the heater is in an effective condition when the smoked panel 502 disposed on the knob 50 of the function lever 51 is illuminated with red light, and that the cooler is in an effective condition when this smoked panel 502 is illuminated with blue light. Thus, the occupant can avoid causing discomfort by actuating the cooler or heater when the cooler or the heater is not in a condition suitable for operation.

In the fifth embodiment, the heater switch 62 and the cooler switch 58 may be omitted, and the first and second lamps 64 and 65 may be disposed on the actuator panel.

Also, in the fifth embodiment, a projection 504 as indicated by the broken line in FIG. 8 may be disposed in the knob 50 between the first lamp 64 and the second lamp 65 to define left and right recesses, in which the first lamp 64 and the second lamp 65 are disposed respectively. The diffusion plate 501 and the smoked panel 502 are divided to respective left and right pieces. Thus, when the first and second lamps 64 and 65 are energized at the same time, the left piece of the smoked panel 502 in FIG. 8 is illuminated blue and the right piece is illuminated red, thereby clearly showing the cooler and the heater being operative.

Figure 21:
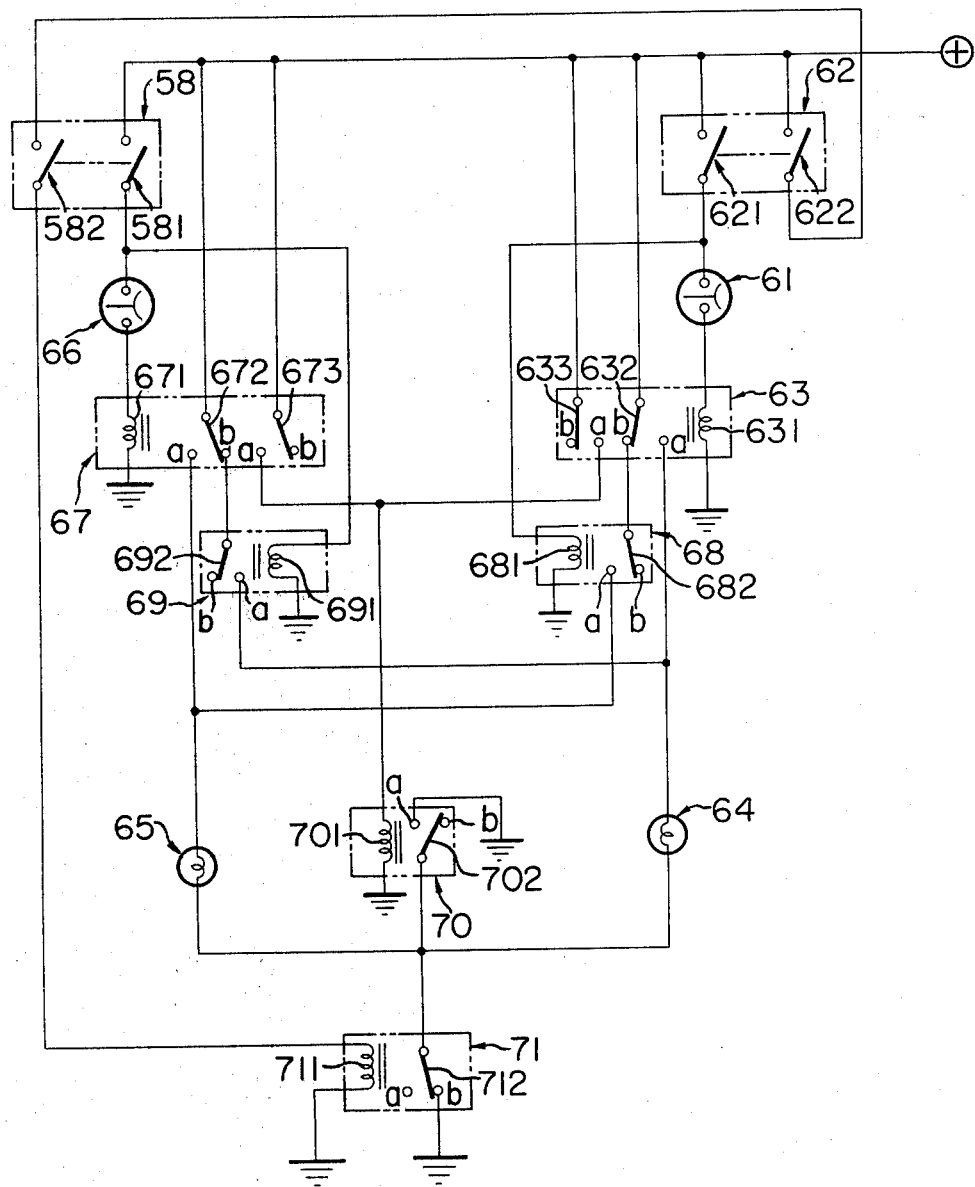
FIG. 21 is a circuit diagram of a sixth embodiment of the present invention.

A sixth embodiment of the invention shown in FIG. 21 is a modification of the fifth embodiment. In this sixth embodiment, when the heater switch 62 is turned on and the first temperature sensor 61 is off, the second lamp 65 is energized and the smoked panel 502 of the knob 50 is illuminated with blue light. When the cooler switch 58 is turned on and the second temperature sensor 66 is off, the first lamp 64 is energized and the smoked panel of the knob 50 is illuminated with red light.

Referring to FIG. 21, the heater switch 62 of a double switch structure comprises a first switch portion 621 and a second switch portion 622. One terminal of the first switch portion 621 is connected with the power source and the other terminal is connected to the first temperature sensor 61. This temperature sensor 61 is connected with the exciting coil 631 of the first heater relay 63. The first heater relay 63 has the first movable arm 632 and the second movable arm 633. The first movable arm 632 is connected with said power source and brought into contact with the contacts a and b when the exciting coil 631 is energized and deenergized respectively. Said contact a is connected with the first lamp 64 emitting red light, while said contact b is connected with the movable arm 682 of a second heater relay 68. Also, the second movable arm 633 is connected with the power source and brought into contact with contacts a and b when the exciting coil 631 is energized and deenergized respectively. Said contact a is connected with the exciting coil 701 of a first switching relay 70 described hereinafter, and said contact b forms an open contact. The second heater relay 68 comprises an exciting coil 681, the movable arm 682 and contacts a and b. The exciting coil 681 is connected with the other terminal of the first switch portion 621 of the heater switch 62. The movable arm 682 is brought into contact with contacts a and b when the exciting coil 681 is energized and deenergized respectively. Said contact a is connected with the second lamp 65 which emits blue light, and said contact b forms an open contact. The cooler switch 58 of double switch structure comprises a first switch portion 581 and a second switch portion 582. One terminal of the first switch portion 581 is connected with the power source, and the other terminal is connected with an exciting coil 671 of the first cooler relay 67 through the second temperature sensor. The first cooler relay 67 has a first movable arm 672 and a second movable arm 673. The first movable arm 672 is connected with the power source and brought into contact with the contacts a and b when the exciting coil 671 is energized and deenergized respectively. Said contact a is connected with the second lamp 65, and the contact b is connected with a movable arm 692 of a second cooler relay 69 described hereinafter. The second movable arm 673 is connected with the power source and brought into contact with contacts a and b when the exciting coil 671 is energized and deenergized respectively. This contact a is connected with the exciting coil 701 of the first switching relay 70 described hereinafter and said contact b is formed as an open contact. The second cooler relay 69 has an exciting coil 691 connected with the other terminal of the first switch portion 581 of the cooler switch 58 and a movable arm 692 brought into contact with contacts a and b when the exciting coil 691 is energized and deenergized respectively. Said contact a is connected with the first lamp 64 while the contact b forms an open contact. The first switching relay 70 has an exciting coil 701 and a movable arm 702. The movable arm 702 is connected with the first and second lamps 64 and 65 and brought into contact with contacts a and b when the exciting coil 701 is energized and deenergized respectively. Furthermore, the contact a is grounded and the contact b is formed as an open contact. One terminal of the second switch portion 622 of the heater switch 62 is connected with the power source and the other terminal is connected to an exciting coil 711 of a second switching relay 71 through the second switch portion 582 of the cooler switch 58. A movable arm 712 of the second switching relay 71 is connected with first and second lamps 64 and 65 and brought into contact with contacts a and b when the exciting coil 711 is energized and deenergized respectively. The contact a is formed as an open contact and the contact b is grounded.

The operation of the above described embodiment will be explained below.

Firstly, the heater lever 52 is moved to the "OFF" position, the heater switch 62 is turned off, and the cooler switch 58 is turned off. The first movable arm 632 of the first heater relay 63 contacts with the contact b and the movable arm 682 of the second heater relay 68 contacts with the contact b. Also, the first movable arm 672 of the first cooler relay 67 and the movable arm 692 of the second cooler relay 69 contact with the corresponding contacts b. Electrical current is not sent to the first lamp 64 and the second lamp 65 and both lamps are not energized.

Then, the heater lever 52 is moved from the "OFF" position toward the "HOT" position and the heater switch 62 is turned on. If the temperature of the engine cooling water is less than the predetermined value, the first temperature sensor 61 is off and therefore the exciting coil 631 of the first heater relay 63 is not energized, so that the first movable arm 632 of the first heater relay 63 contacts with the contact b. Since the heater switch 62 is on, the exciting coil 681 of the second heater relay 68 is energized and the movable arm 682 is brought into contact with the contact a. In addition, since the cooler switch 58 is off, the second switching relay 71 does not operate and the movable arm 712 contacts with the contact b. Therefore, electrical current from the power source reaches the second lamp 65 through the first movable arm 632 of the first heater relay 63, the movable arm 682 of the second heater relay 68 and its contact a and is earthed through the movable arm 712 of the second switching relay 71 and its contact b. Accordingly, the second lamp 65 is energized and the smoked panel 502 of the knob 50 is illuminated with blue light.

If the temperature of the engine cooling water reaches or exceeds the predetermined value, the first temperature sensor 61 is turned on, the exciting coil 631 of the first heater relay 63 is energized and the first movable arm 632 contacts with the contact a. In addition, since the cooler switch 58 is off, the second switching relay 71 is in an unoperational condition. Therefore, electrical current from the power source reaches the first lamp 64 through the first heater relay 63 and is earthed through the second switching relay 71. The first lamp 64 is energized and the smoked panel 502 of the knob 50 is illuminated with red light.

Then, the heater lever 52 is moved to the "OFF" position, the heater switch 62 is turned off and the cooler switch 58 is turned on. If the temperature of the surface of the cooler core 7 is at or higher than the predetermined value, the first cooler relay 67 is in an unoperative condition and the first movable arm 672 contacts with the contact b since the second temperature sensor 66 is off. Also, since the cooler switch 58 is on, the exciting coil 691 of the second cooler relay 69 is energized and the movable arm 692 contacts with the contact a. Since the heater switch 62 is off, the second switching relay 71 does not operate and the movable arm 712 of this relay is earthed through the contact b. Therefore, electrical current from the power source reaches the first lamp 64 through the first movable arm 672 of the first cooler relay 67, the movable arm 692 of the second cooler relay 69 and its contact a and then is earthed through the second switching relay 71. Therefore, the first lamp 64 is energized and the smoked panel 502 of the knob 50 is illuminated with red light.

When the temperature of the surface of the cooler core 7 becomes less than the predetermined value, the second temperature sensor 66 is turned on. Because the exciting coil 671 of the first cooler relay 67 is energized, the first movable arm 672 contacts with the contact a. In addition, since the heater switch 62 is off, the second switching relay 71 continues to be unoperational and the movable arm 712 is earthed through the contact b. Since electrical current from the power source is earthed through the first movable arm 672 of the first cooler relay 67, the second lamp 65 and the movable arm 712 of the second switching relay 71, the second lamp 65 is energized and the smoked panel 502 of the knob 50 is illuminated with blue light.

Then, the heater lever 52 is moved from the "OFF" position toward the "HOT" position, the heater switch 62 is turned on and the cooler switch 58 is turned on.

If the temperature of the engine cooling water is less than the predetermined value (50° C.) and the temperature of the surface of the cooler core 7 is at or higher than the predetermined value (10° C.), the first and second temperature sensors 61, 66 are turned off, and the second movable arms 633 and 673 of the first heater relay 63 and the first cooler relay 67 respectively contact with the corresponding contacts b. Therefore, the first switching relay 70 continues to be in an unoperational condition as shown in FIG. 21, and the movable arm 702 contacts with the open contact b. Since the heater switch 62 and the cooler switch 58 are on, the exciting coil 711 of the second switching relay 71 is energized and the movable arm 712 contacts with the open contact a. Therefore, the first and second lamps 64 and 65 are not energized.

In this condition, when the temperature of the engine cooling water is at or above the predetermined value, the first temperature sensor 61 is turned on and the exciting coil 631 of the heater relay 63 is energized, so that the first and second movable arms 632 and 633 both contact with the corresponding contacts a. Since the second movable arm 633 contacts with the contact a, the exciting coil 701 of the first switching relay 70 is energized and the movable arm 702 of this relay 70 contacts with the contact a. Therefore, the electrical current which reaches the first lamp 64 through the first movable arm 632 of the first heater relay 63 is earthed through the movable arm 702 of the first switching relay 70 and the first lamp 64 is energized to illuminate the smoked panel 502 of the knob 50 with red light.

When the heater switch 62 and the cooler switch 58 are both on, and if the temperature of the engine cooling water is less than the predetermined value and the temperature of the surface of the cooler core 7 is less than the predetermined value, the first temperature sensor 61 is off and the second temperature sensor 66 is on. Since this second temperature sensor 66 is on, the exciting coil 671 of the first cooler relay 67 is energized and the first and second movable arms 672 and 673 contact with the corresponding contacts a. Electrical current passes through the second movable arm 673 and energizes the exciting coil 701 of the first switching relay 70 to bring the movable arm 702 into contact with the contact a. Therefore, electrical current reaches the second lamp 65 through the first movable arm 672 of the first cooler relay 67 and is earthed through the movable arm 702 of the first switching relay 70. The second lamp 65 is energized to illuminate the smoked panel 502 of the knob 50 with blue light.

If the temperature of the engine cooling water is at or higher than the predetermined value, the first temperature sensor 61 is turned on and the first movable arm 632 of the first heater relay 63 contacts with the contact a. Therefore, electrical current reaches the first lamp 64 and this lamp 64 is energized. Since the second lamp 65 is also energized, the smoked panel 502 of the knob 50 is illuminated with purple light which is a mixture of the red and blue lights.

Table 5 gives the lighting modes of the first and second lamps.

TABLE 5

| Operating Conditions | | | | Lamp | |
|---|---|---|---|---|---|
| Heater Switch | Cooler Switch | First Temperature Sensor | Second Temperature Sensor | First Lamp Red | Second Lamp Blue |
| OFF | OFF | OFF | OFF | X | X |
| | | | ON | X | X |
| | | ON | OFF | X | X |
| | | | ON | X | X |
| | ON | OFF | OFF | O | X |
| | | | ON | X | O |
| | | ON | OFF | O | X |
| | | | ON | X | O |
| ON | OFF | OFF | OFF | X | O |
| | | | ON | O | X |
| | | ON | OFF | O | X |
| | | | ON | O | X |
| | ON | OFF | OFF | X | X |
| | | | ON | X | O |
| | | ON | OFF | O | X |
| | | | ON | O | O |

Remarks:
"X" indicates the lamp is not energized.
"O" indicates the lamp is energized.

In the above sixth embodiment, by disposing a partition between the first lamp 64 and the second lamp 65 and by separating the smoked panel 502 into a first section which is only illuminated by the first lamp 64 and a second section which is illuminated only by the second lamp 65, it is possible to have the smoked panel 502 illuminated with red and blue lights when the first and second lamps 64 and 65 are energized at the same time.

Figure 22:
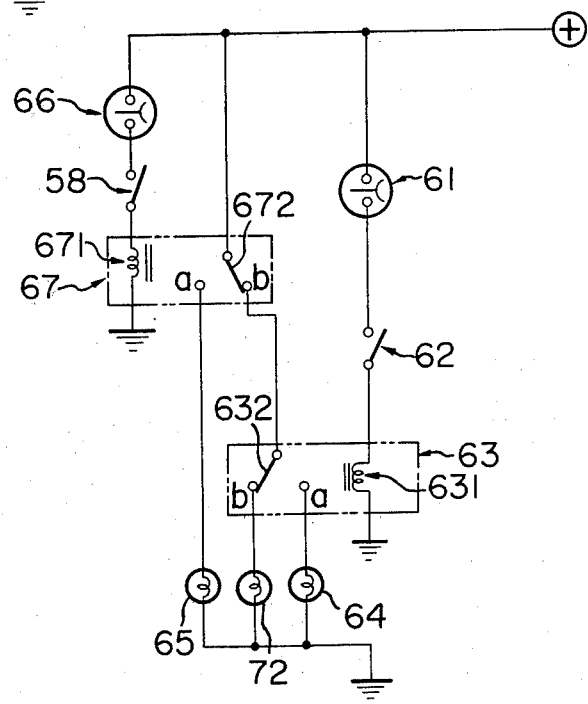
FIG. 22 is a circuit diagram of a seventh embodiment of the present invention.
Figure 23:
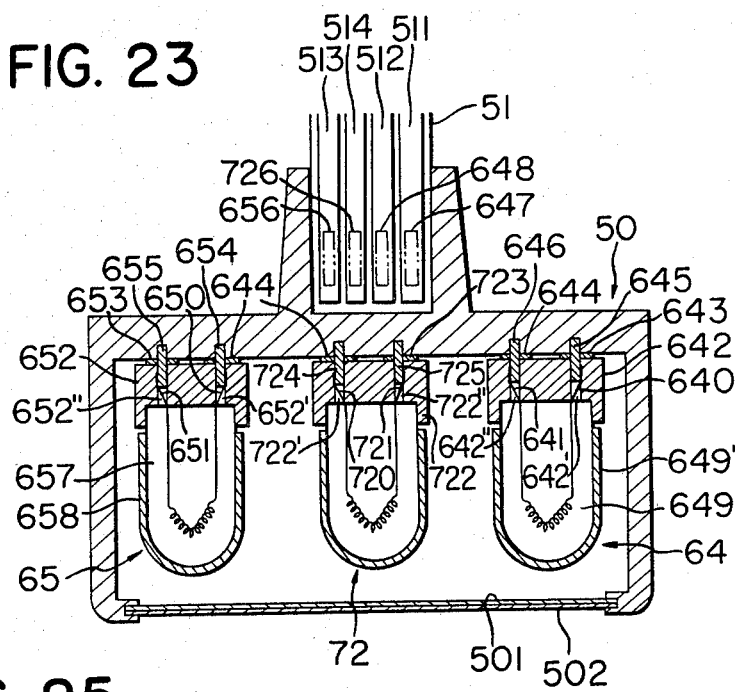
FIG. 23 is a sectional view of part of an air conditioner actuator associated with the seventh embodiment.

A seventh embodiment of the invention shown in FIGS. 22 and 23 is a modification of the fourth embodiment. When the temperature of the engine cooling water is less than the predetermined value and the temperature of the surface of the cooler core is at or above the predetermined value, a third lamp is energized to emit green light.

Referring to FIGS. 22 and 23, the first temperature sensor 61 is connected with the exciting coil 631 of the heater relay 63 through the heater switch 62. The second temperature sensor 66 is connected with the exciting coil 671 of the cooler relay 67 through the cooler switch 58. The cooler relay 67 has the movable switch 672 connected with the power source, the contact a connected with the second lamp 65, and contact b connected with the movable arm 632 of the heater relay 63. The contact a of the heater relay 63 is connected with the first lamp 64 and a contact b is connected with the third lamp 72 which emits green light.

As shown in FIG. 23, this third lamp 72 has bare leads 720 and 721. These leads 720 and 721 are inserted into holes 722' and 722" formed in a rubber base 722. Pins 724 and 725 are implanted in the knob 50 and connected with the second conductive plate 644 and a fourth conductive plate 723 respectively. The pins 724 and 725 are press-fitted into the holes 722' and 722", so that through contraction of the base 722, the leads 720 and 721 are respectively urged into abutment with the pins 724 and 725. The fourth conductive plate 723 is connected with a fourth printed circuit board 514 disposed on the upper surface of the function lever 51 through a fourth brush 726 formed by spring steel. This fourth printed circuit board 514 is connected with the contact b of the heater relay 63 through a wire harness.

In operation, when the heater switch 62 and the cooler switch 58 are turned off, the heater relay 63 and the cooler relay 67 do not operate, their respective movable arms 632 and 672 contact with the corresponding contacts b, and the third lamp 72 is energized to illuminate the smoked panel 502 with green light.

When the heater switch 62 is on and the cooler switch 58 is off, the movable arm 632 of the heater relay 63 contacts with the contact a, so that the first lamp 64 is energized and the smoked panel 502 is illuminated with red light.

When the heater switch 62 is off and the cooler switch 58 is on, the movable arm 672 of the cooler relay 67 contacts with the contact a, so that the second lamp 65 is energized and the smoked panel 502 is illuminated with blue light.

The lighting modes of the first to third lamps 64, 65 and 72 are shown in Table 6.

TABLE 6

| Operating Conditions | | | | Lamp | | |
| --- | --- | --- | --- | --- | --- | --- |
| Heater Switch | Cooler Switch | First Temperature Sensor | Second Temperature Sensor | First Lamp Red | Second Lamp Blue | Third Lamp Green |
| OFF | OFF | OFF | OFF | X | X | O |
|  |  |  | ON | X | X | O |
|  |  | ON | OFF | X | X | O |
|  |  |  | ON | X | X | O |
|  | ON |  | OFF | X | X | O |
|  |  | OFF | ON | X | O | X |
|  |  | ON | OFF | X | X | O |
|  |  |  | ON | X | O | X |
| ON | OFF | OFF | OFF | X | X | O |
|  |  |  | ON | X | X | O |
|  |  | ON | OFF | O | X | X |
|  |  |  | ON | O | X | X |
|  | ON | OFF | OFF | X | X | O |
|  |  |  | ON | X | O | X |
|  |  | ON | OFF | O | X | X |
|  |  |  | ON | X | O | X |

Remarks:
"X" indicates the lamp is not energized.
"O" indicates the lamp is energized.

In the above embodiment, it is possible to omit the heater switch 62 and the cooler switch 58.

Figure 25:
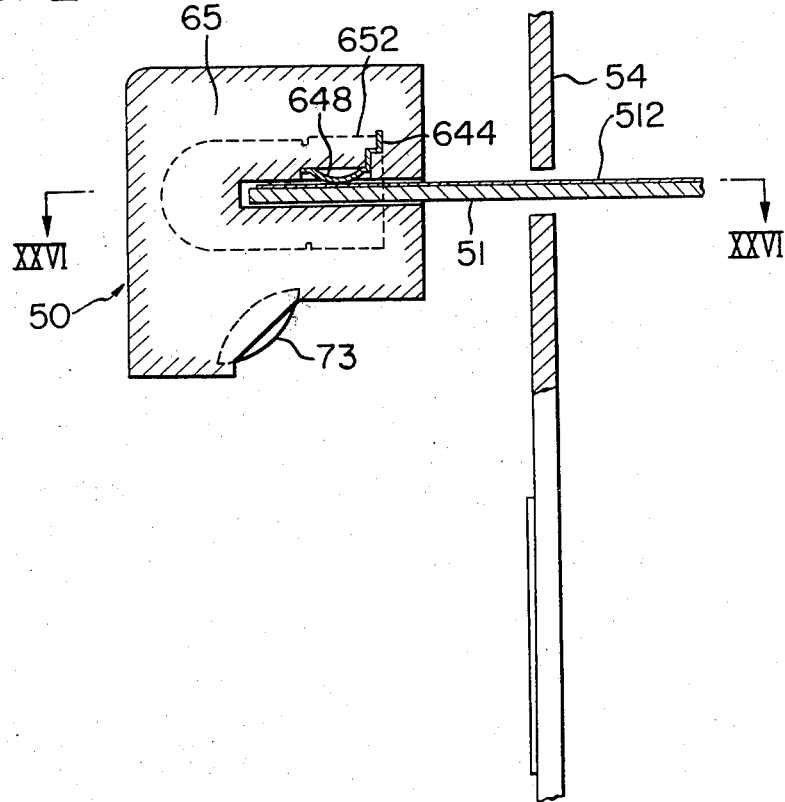
FIG. 25 is a sectional view taken along the line XXV—XXV in FIG. 24.
Figure 26:
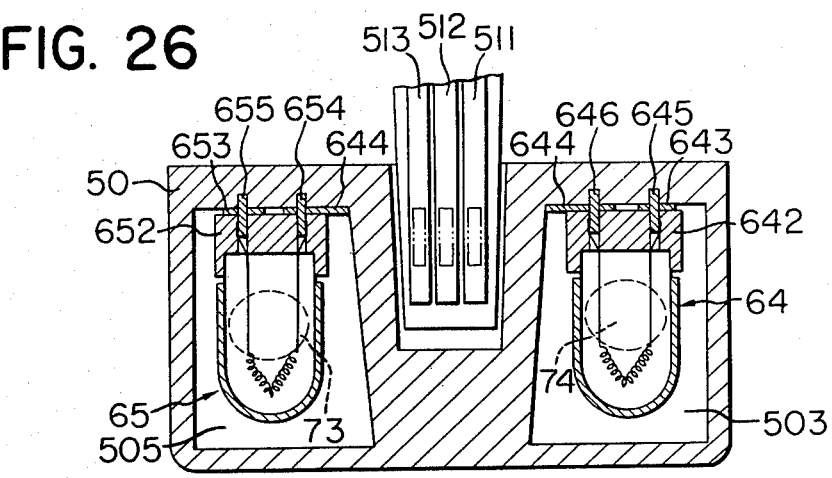
FIG. 26 is a sectional view taken along the line XXVI—XXVI in FIG. 25.

In an eighth embodiment of the invention shown in FIGS. 24 to 26, instead of illuminating the smoked panel 502 disposed in the knob 50 in the third embodiment by the first and second lamps 64 and 65, these lamps 64 and 65 illuminate letters "RECIRC", "VENT", "HEAT" and "DEF" and pictorial displays corresponding to functions of the letters, said letters and pictorial displays being depicted on the actuator panel 54. The same numbers are used for designating parts similar to those in the third embodiment.

Referring to FIGS. 24 to 26, "RECIRC" display 81, "VENT" display 82, "HEAT" display 83 and "DEF" display 84 are depicted on the actuator panel 54 in white. The "RECIRC" display 81 comprises the letters "RECIRC" and a pictorial display representing recirculation of air within the vehicle compartment, the "VENT" display 82 comprises the letters "VENT" and a pictorial display representing air being directed toward the upper half of the bodies of the occupants, the "HEAT" display 83 comprises the letters "HEAT" and a pictorial display representing air being directed toward the feet of the occupants, and the "DEF" display 84 comprises the letters "DEF" and a pictorial display representing air being directed toward the vehicle front glass. The knob 50 is provided on the end of the function lever 51 which protrudes from this actuator panel 54. As shown in FIG. 26, the knob 50 is separated into two parts. The first lamp 64 is disposed in the right part 503 and the second lamp 65 is disposed in the left part 505. Also, as shown in FIG. 25, a convex lens 73 is disposed in the lower surface of the left part 505. Another convex lens 74 is disposed in the lower surface of the right part 503. The light from the first or second lamp 64, 65 is focused by the lens 73 or 74 and illuminates the displays 81 to 84. The circuit of the temperature display device 6 is the same as that shown in FIG. 15.

In operation, when the function lever 51 is in the position B as shown in FIG. 24, air is discharged from the ventilation air discharge duct outlet 25' in the vehicle compartment. At this time, if the heater lever 52 is moved to the "OFF" position and the cooler switch 58 is turned on, the heater switch 62 is turned off in the circuit shown in FIG. 15.

If the temperature of the surface of the cooler core 7 is at or above the predetermined value, the second temperature sensor 66 is turned off, the exciting coil 671 of the cooler relay 67 is not energized and the movable arm 672 contacts with the contact b. Therefore, electrical current does not reach the second lamp 65 and the first lamp 64 is not energized either since the heater relay 63 is open.

If the temperature of the surface of the cooler core 7 is less than the predetermined value, the second temperature sensor 66 is turned on and the movable arm 672 is brought into contact with the contact a through the magnetic force of the exciting coil 671 of the cooler relay 67. Electrical current flows to the second lamp 65 through the movable arm 672 and the second lamp 65 is energized. Thereby, the blue light emitted from the lamp is focused by the convex lens 73 and reaches the "VENT" display 82, and this display 82 is illuminated with blue light.

When the function lever 51 is moved to the position D in FIG. 24, air is discharged through the foot air discharge duct outlet 24'. Then, the heater lever 52 is moved from the "OFF" position toward the "HOT" position, the heater switch 62 is turned on and the cooler switch 58 is turned on.

When the temperature of the engine cooling water is at or above the predetermined value and the surface temperature of the cooler core 7 is at or above the predetermined value, the second temperature sensor 66 is turned off and the cooler relay 67 continues to be in an unoperational condition. On the other hand, the first temperature sensor 61 is turned on and the heater relay 63 is closed. Therefore, electrical current flows to the first lamp 64 through the movable arms 672 and 632. The first lamp 64 is energized and emits red light which is sent to the "HEAT" display 83 through the convex lens 74 to illuminate the display 83 red.

When the surface temperature of the cooler core 7 becomes less than the predetermined value, the second temperature sensor 66 is turned on and the movable arm 672 is brought into contact with the contact a by energization of the exciting coil 671 of the cooler relay 67. The first lamp 64 is energized, the second lamp 65 is energized and sends a blue light to the "HEAT" display 83.

The lighting modes of lamps 64 and 65 are the same as those shown in Table 2.

Therefore, the displays 81 to 84 corresponding to the position of the function lever 51 on the actuator panel 54 are illuminated blue or red according to the temperature of the engine cooling water and the surface temperature of the cooler core 7. By the color illuminated on these displays 81 to 84, the occupant can easily determine whether or not the cooler or the heater is in an effective condition.

In the eighth embodiment, a diffusion plate 502 used in the seventh embodiment may be used instead of the convex lens 74, 75 to obtain the same results.

A ninth embodiment of the invention is shown in FIGS. 27 to 33. Instead of illuminating the smoked panel 502 of the knob 50 with the first and second lamps 64 and 65, as in the third embodiment, displays corresponding to the operation of the air conditioner actuator and depicted on the actuator panel 54 are illuminated by the lamps. The same numbers are used for designating parts similar to those in the third embodiment.

Figure 28:
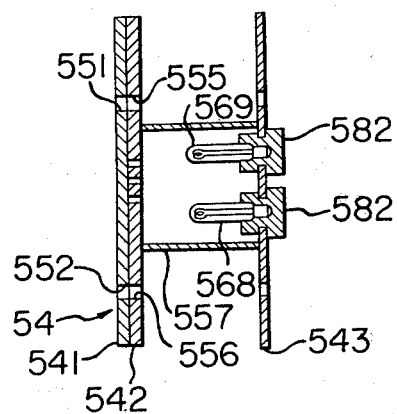
FIG. 28 is a sectional view taken along the line XXVIII—XXVIII in FIG. 27.

Referring to FIGS. 27 to 33, as shown in FIG. 27, the actuator panel 54 is provided with "FRESH" display 80, "RECIRC" display 81, "VENT" display 82, "HEAT" display 83, "DEF" display 84, letters "OFF" and "HOT" and lines therebetween which show the operation of the heater lever 52, displays showing positions of the fan switch 53 and arcuate lines therearound indicating the effectiveness of the cooler The "FRESH" display 80 comprises a profile of the vehicle, a first arrow display 558 comprising a plurality of arrows around the bonnet area of the profile of vehicle for indicating flow of air into the vehicle compartment, and the letters "FRESH". The "RECIRC" display 81 comprises the profile of the vehicle, a second arrow display 559 comprising a plurality of arrows in the portion of the profile of vehicle corresponding to the vehicle compartment for indicating recirculation of air within the vehicle compartment, and the letters "RECIRC". The "VENT" display 82 comprises a profile showing the upper half of a human body, a third arrow display 560 comprising a plurality of arrows extending toward this profile of the body, and the letters "VENT". The "HEAT" display 83 comprises a profile of a human leg, a fourth arrow display 561 comprising a plurality of arrows extending toward this profile of the leg, and the letters "HEAT". The "DEF" display 84 comprises a profile of the vehicle front glass, a fifth arrow display 562 comprising a plurality of arrows extending toward this profile of the front glass, and the letters "DEF". The actuator panel 54 has a display panel 541, a shielding plate 542 and a base panel 543, as shown in FIG. 28.

Figure 29:
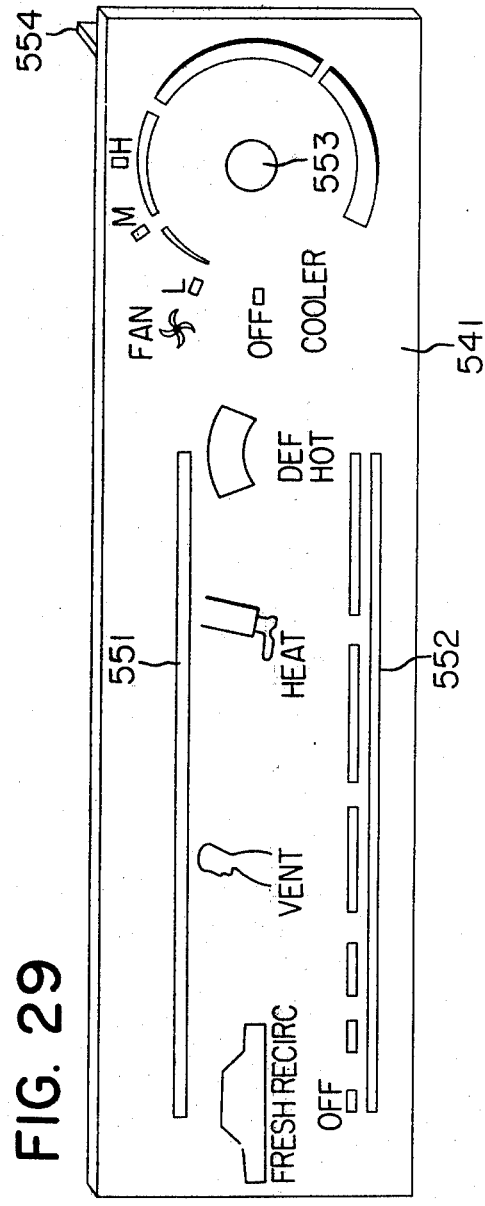
FIG. 29 is a front elevational view of a display panel in FIG. 28.

As shown in FIG. 29, the display panel 541 is formed from a smoked panel and provided with a first longitudinal slot 551 in which the function lever 51 moves, a second longitudinal slot 552 in which the heater lever 52 moves and a circular hole 553 through which shafts of the fan switch 53 and the cooler switch 58 are passed. On the back surface of the display panel, a pictorial display showing the profile of the vehicle is depicted in white beneath the left end of the first longitudinal slot 551, and the letters "FRESH" and "RECIRC" are depicted in white below the left and right portions of the vehicle profile. The pictorial display showing the vehicle profile omits a portion of the profile corresponding to the rear part of the bonnet. A pictorial display showing the profile of the upper half of the human body and the letters "VENT" below this pictorial display are depicted in white on the right side of the vehicle profile. A pictorial display showing the profile of the upper half of the human body and the letters "HEAT" below said pictorial display are depicted in white on the right of the profile of the human body. A pictorial display of the profile of the vehicle front glass and the letters "DEF" below this pictorial display are depicted in white beneath the right end of the first longitudinal slot 551. The letters "OFF" and "HOT" are depicted in white above the left and right ends of the second longitudinal slot 552 respectively, and the six lines are depicted in white between these letters and have their length which become longer as they move from "OFF" to "HOT". Around the outside of the circular hole 553, the letters "OFF", "L", "M", "H" and rectangular notches alongside each letter are depicted in white, and letters "FAN" and an outline of a fan are depicted adjacent to the letter "L" in white. Also, the outside of the circular hole 553, the four arcuate lines growing in thickness in a clockwise direction and the letters "COOLER" below the letters "FAN" are depicted in white. The display panel 541 is provided with a flange 554 projecting from back surface at the right end of the panel.

Figure 30:
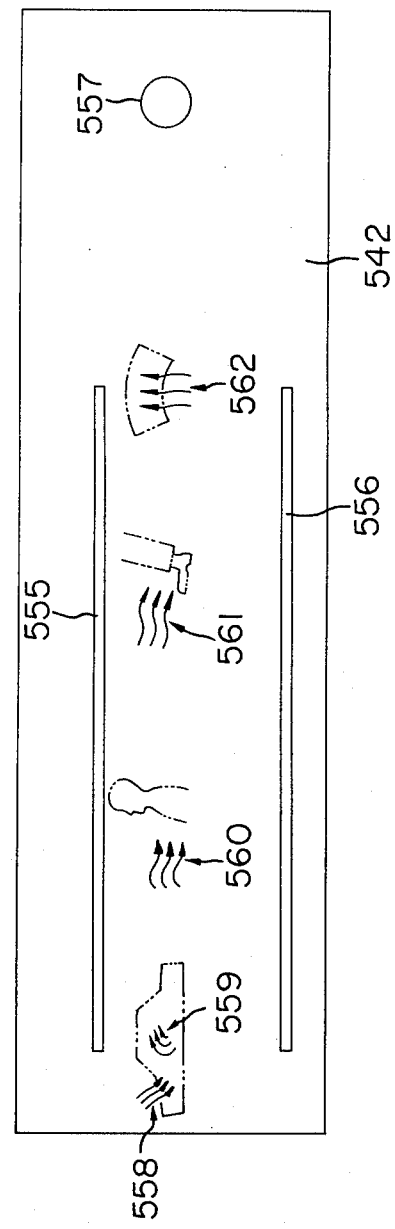
FIG. 30 is a front elevational view of a shielding plate in FIG. 28.

As shown in FIG. 30, the shielding plate 542 disposed on the back surface of the display panel 541 is formed with a third longitudinal slot 555, a fourth longitudinal slot 556 and a circular hole 557 which align respectively with the first and second longitudinal slots 551, 552 and the circular hole 553 of the display panel 541. The first arrow display 558 comprising the plurality of arrows is formed by cutting out portion of the shielding plate 542, so that the arrows enter through the cut in the bonnet section of the pictorial display showing the vehicle profile into the vehicle compartment section of said pictorial display when the shielding plate 542 is mated with the display panel 541. The second arrow display 559 comprising the plurality of arrows on the right side of the first arrow display 558 is formed by cutting out portion of the shielding plate 542, so that the arrows are disposed in said pictorial display of the vehicle profile for indicating the recirculation of air with the vehicle compartment when the shielding plate 542 is mated with the display panel 541. The third arrow display 560 comprising the plurality of arrows is formed by cutting out portion of the shielding plate 542, so that the arrows extend toward the pictorial display showing the upper half of the human body from the left side of said pictorial display when the shielding plate 542 is mated with the display panel 541. The fourth arrow display 561 comprising the plurality of arrows is formed by cutting out portion of the shielding plate 542, so that the arrows extend toward the pictorial display showing the human leg from the left side of said pictorial display when the shielding plate 542 is mated with the display panel 541. The fifth arrow display 562 comprising the plurality of arrows is formed by cutting out portion of the shielding plate 542, so that the arrows extend toward the pictorial display showing the vehicle front glass under said pictorial display when the shielding plate 542 is mated with the display panel 541. When the shielding plate 542 is mated with the rear surface of the display panel 541, the right end of the shielding plate 542 is disposed to the left of the flange 554 of the display panel 541 and the flange projects beyond the shielding plate 542.

Figure 31:
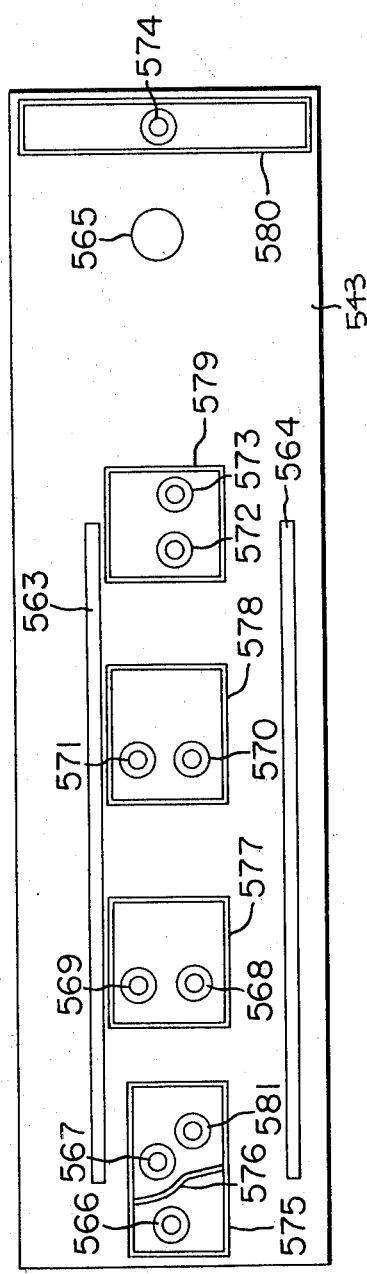
FIG. 31 is a front elevational view of a base panel in FIG. 28.

As shown in FIG. 31, the base panel 543 supports fourth to thirteenth lamps 566 to 574 and 581 and has first to sixth partition plates 575 to 580, fifth and sixth longitudinal slots 563 and 564 and the circular hole 565.

The first partition plate 575 formed of opaque material is implanted on the base panel 543 and encloses the fourth lamp 566, the fifth lamp 567 and the thirteenth lamp 581 which are disposed on the base panel. The second partition plate 576 formed of opaque material is integrally formed with the first partition plate 575 to separate the fourth lamp 566 from the fifth lamp 567 and the thirteenth lamp 581. The third partition plate 577 is formed of opaque material and implanted on the base panel 543 to enclose the sixth and seventh lamps 568 and 569 disposed thereon. The fourth partition plate 578 implanted on the base 543 encloses the eighth and ninth lamps 570 and 571 disposed on the base panel 543 and is formed of opaque material. The fifth partition plate 579 formed of opaque material is implanted on the base panel 543 to form an enclosure in which the tenth and eleventh lamps 572 and 573 are disposed. The sixth partition plate 580 is formed of opaque material and is implanted on the base panel 543 to form a rectangular wall so as to enclose the twelfth lamp 574. The first to sixth partition plates 575 to 580 are implanted on the base panel 543 at the same height. The edges of the partition plates 575 to 580 are adhered to the back surface of the shielding plate 542, as shown in FIG. 28, so that the base panel 543 is fixed to the shielding plate 542. When the base panel 543 is fixed to the shielding plate 542, the fourth lamp 566 is positioned behind the first arrow display 558 so as to illuminate only the first arrow display 558 in the shielding plate 542. The fifth lamp 567 and the thirteenth lamp 581 are positioned behind the second arrow display 559 so as to illuminate only the second arrow display 559. The sixth and seventh lamps 568 and 569 are positioned behind the third arrow display 560 and illuminate only this arrow display 560. The eighth and ninth lamps 570 and 571 are positioned behind the arrow display 561 to illuminate only the fourth arrow display 561. The tenth and eleventh lamps 572 and 573 are positioned behind the fifth arrow display 562 to illuminate only the fifth arrow display 562. The flange 554 on the display panel 541 attached to the front surface of the shielding plate 542 is inserted into the space enclosed by the sixth partition plate 580. The fifth and sixth longitudinal slots 563 and 564 and the circular hole 565 are formed at the positions of the base panel 543 opposite respectively to the third and fourth longitudinal slots 555 and 556 and the circular hole 557 formed in the shielding plate 542. As shown in FIG. 28, the sixth and seventh lamps 568 and 569 are mounted in sockets 582 which are in turn inserted and fixed in the base panel 543, whereby both lamps 568 and 569 are fixed to the base panel 543. The other lamps 566, 567, 570, 571, 572, 573, 574 and 581 are fixed in the same manner. The energizing circuits for the fourth to thirteenth lamps 566 to 574 and 581 are shown in FIG. 32.

Figure 32:
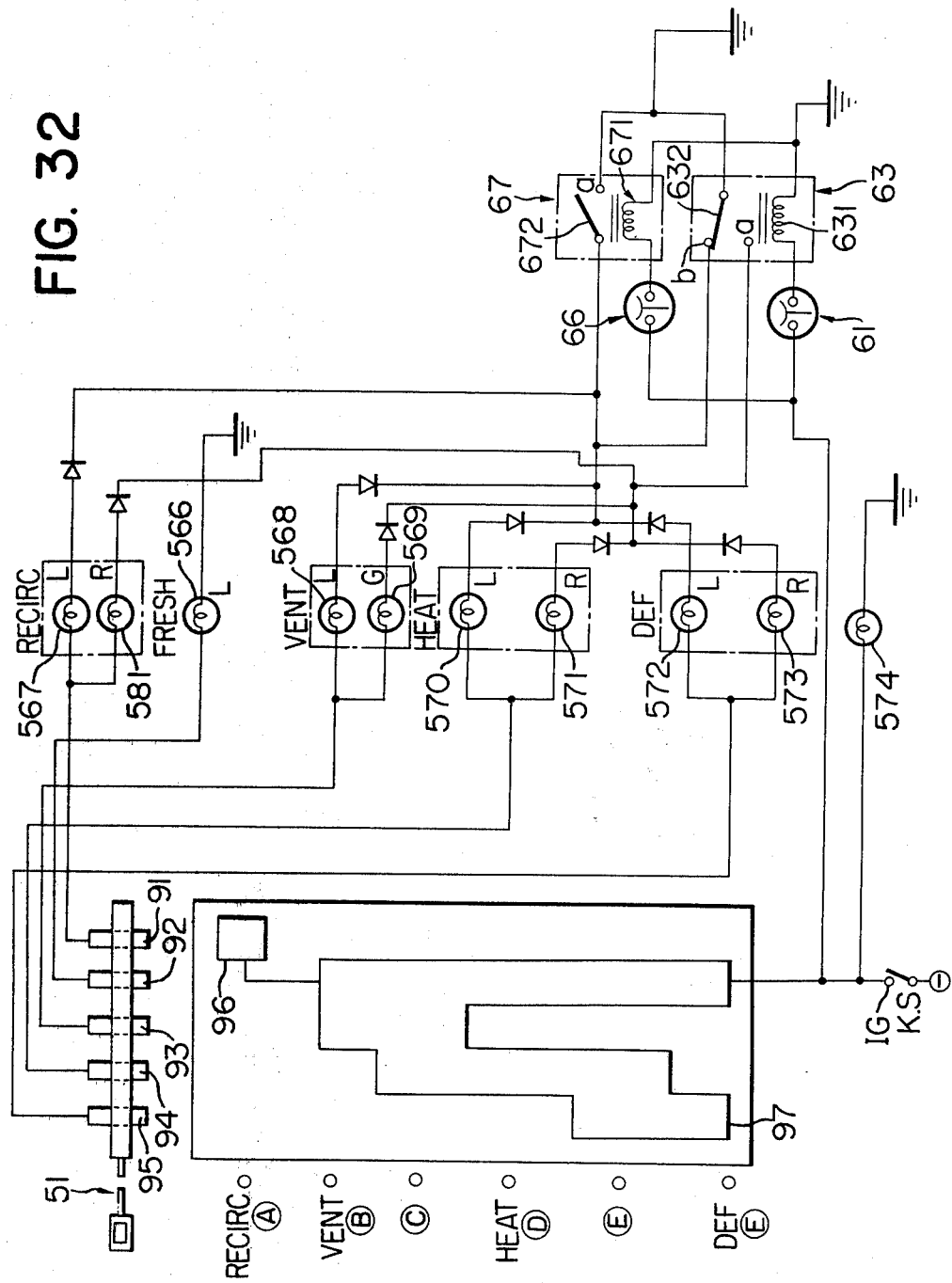
FIG. 32 is a circuit diagram of the ninth embodiment.

Referring to FIGS. 32, the fourth lamp 566 emits blue light and is connected with a sixth brush 92 mounted on the function lever 51. The fifth lamp 576 also emits blue light and is connected at one terminal with a fifth brush 91 mounted on the function lever 51 and at the other terminal with the contact b of the heater relay 63 and the movable arm 672 of the cooler relay 67 through a diode. The thirteenth lamp 581 is connected at one terminal with the fifth brush 91 and at the other terminal with the contact a of the heater relay 63 through a diode and emits red light when energized. The sixth lamp 568 emits blue light and is connected at one terminal with a seventh brush 93 mounted on the function lever 51 and at the other terminal with the movable arm 672 of the cooler relay 67 and the contact b of the heater relay 63 through a diode. The seventh lamp 569 is connected at one terminal with the seventh brush 93 and at the other terminal with the contact a of the heater relay 63 through a diode and emits green light when energized. The eighth lamp 570 emits blue light when energized and is connected at one terminal with an eighth brush 94 mounted on the function lever 51 and at the other terminal with the contact b of the heater relay 63 and the movable arm 672 of the cooler relay 67 through a diode. The ninth lamp 571 is connected at one terminal with the eighth brush 94 and at the other terminal with the contact a of the heater relay 63 through a diode and emits red light. The tenth lamp 572 is connected at one terminal with a ninth brush 95 mounted on the function lever 51 and at the other terminal with the contact b of the heater relay 63 and the movable arm 672 of the cooler relay 67 through a diode and emits blue light when energized. The eleventh lamp 573 emits red light and is connected at one terminal with the ninth brush 95 and at the other terminal with the contact a of the heater relay 63 through a diode. The exciting coil 631 of heater relay 63 is connected at one terminal with ground and at the other terminal with the IG terminal of the ignition key switch K.S through the first temperature sensor 61. The movable arm 632 of the relay 63 is grounded and brought into contact with the contacts a and b when the exciting coil 631 is energized and deenergized respectively. The exciting coil 671 of the cooler relay 67 is connected at one terminal with the IG terminal through the second temperature sensor 66 and at the other terminal with ground. The contact a of the cooler relay 67 is grounded. When the exciting coil 671 is energized, the movable arm 672 is brought into contact with the contact a and the relay 67 is closed. The twelfth lamp 574 emits colorless light and is connected at one terminal with the IG terminal and at the other terminal with ground. First and second electrode plates 96 and 97 are disposed on the upper surface of the body 5' of the air conditioner actuator 5 and are connected to the IG terminal of the ignition key switch K.S. When the knob 50 of the function lever 51 is moved to the "RECIRC" position indicated by A in FIGS. 27 and 32, the fifth brush 91 contacts with the first electrode plate 96. When the knob 50 of the function lever 51 is moved to the "VENT" position indicated by B, the sixth brush 92 and the seventh brush 93 contact with the second electrode plate 97. When the knob 50 of the function lever 51 is moved to a position between "VENT" and "HEAT" as indicated by C, the sixth, seventh and eighth brushes 92, 93 and 94 contact with the second electrode plate 97. When the knob 50 of the function lever 51 is moved to the "HEAT" position indicated by D, the sixth and eighth brushes 92 and 94 contact with the second electrode plate 97. When the knob 50 of the function lever 51 is moved to a position between "HEAT" and "DEF" as indicated by E, the sixth, eighth and ninth brushes 92, 94 and 95 contact with the second electrode plate 97. When the knob 50 of the function lever 51 is moved to the "DEF" position shown by F, the sixth and ninth brushes 92 and 95 contact with the second electrode plate 97.

Figure 33:
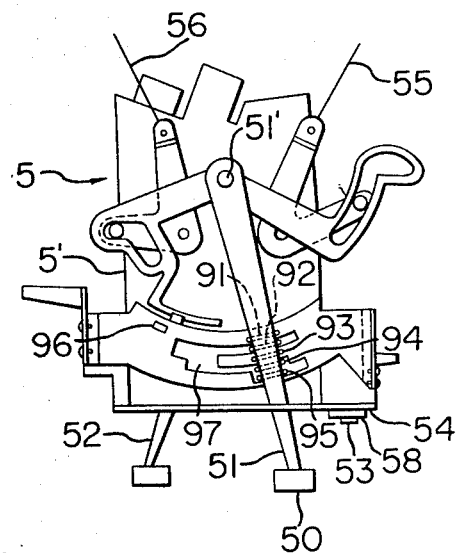
FIG. 33 is an enlarged plan view of an air conditioner actuator associated with the ninth embodiment.

The positioning relationship between the fifth to ninth brushes 91 to 95 and the first and second electrode plates 96 and 97 are shown in FIG. 33. The fifth to ninth brushes 91 to 95 are mounted on the lower surface of the function lever 51 which rotates around an axis 51' and are positioned in spaced relationship with each other between the axis 51' and the knob 50. The first electrode plate 96 is in the form of a rectangle and is positioned under the track of movement of the fifth brush 91 so as to be contacted by the fifth brush 91. The second electrode plate 97 is of an arcuated, substantially U shape and positioned under the track of movement of the sixth to the ninth brushes 92 to 95 so as to be contacted by the sixth to ninth brushes 92 to 95. Both the fifth to ninth brushes 91 to 95 and the first and second electrode plates 96 and 97 are schematically arranged and illustrated in FIG. 32 to facilitate explanation.

The operation of the ninth embodiment described above will be explained hereunder.

Firstly, the movable arm of the ignition key switch K.S is brought into contact with the IG terminal. The twelfth lamp 574 is energized and the light emitted therefrom penetrate into the display panel 541 from the flange portion 554 of the display panel 541, so that the display panel 541 is brightly illuminated. The pictorial display of the vehicle profile, the letters "FRESH" and "RECIRC", the pictorial display of the upper half of the human body, the letters "VENT", the pictorial display of the human leg, the letters "HEAT", the pictorial display of the vehicle front glass, the letters "DEF", the letters "OFF" and "HOT", the six lines therebetween, the letters "FAN", "OFF", "L", "M" and "H", the display of the fan, the square notches alongside the letters "OFF", "L", "M" and "H", four arcuate lines and the letters "COOLER" are respectively shown in relief on the display panel 541.

When the knob 50 of the function lever 51 is moved to the "RECIRC" position A, the fifth brush 91 contacts with the first electrode plate 96.

In such a case, if the temperature of the surface of the cooler core 7 is at or above the predetermined value and the temperature of the engine cooling water is less than the predetermined value, the first temperature sensor 61 and the second temperature sensor 66 are turned off. The cooler relay 67 continues to be in an unoperational condition and the movable arm 672 is separated from the contact a. Since the exciting coil 631 of the heater relay 63 is deenergized, the movable arm 632 is in contact with the contact b. Electrical current from the IG terminal reaches the fifth lamp 567 through the second electrode plate 97, the first electrode plate 96 and the fifth brush 91 and then is grounded through the contact b and the movable arm 632 of the heater relay 63. Therefore, the fifth lamp 567 is energized and emits blue light. This blue light reaches the display panel 541 by passing through the second arrow display 559 which comprises the arrows formed from cut-outs or slots in the shielding plate 542, and the second arrow display 559 is illuminated blue in relief in the pictorial display of the vehicle profile to display the "RECIRC" display 81.

If the temperature of the surface of the cooler core 7 is at or above the predetermined value and the temperature of the engine cooling water is at or above the predetermined value, the first temperature sensor 61 is turned on and the second temperature sensor 66 continues to be off. The cooler relay 67 continues to be off. The exciting coil 631 of the heater relay 63 is energized and the movable arm 632 is brought into contact with the contact a. Electrical current from the IG terminal reaches the thirteenth lamp 581 through the second electrode plate 97, the first electrode plate 96 and the fifth brush 91 and then is grounded through the contact a and the movable switch 632 of the heater relay 63. The thirteenth lamp 581 is energized and emits red light.

This light reaches the display panel 541 through the second arrow display 559 comprising cut-outs and the second arrow display 559 is illuminated red in the pictorial display of the vehicle profile depicted in white on the display panel 541 to display the "RECIRC" display 81.

Then, when the cooler switch 58 is turned on to supply refrigerant to the cooler core 7 and the temperature of the surface of the cooler core 7 becomes less than the predetermined value, and if the temperature of the engine cooling water is less than the predetermined value, the first temperature sensor 61 is turned off and the second temperature sensor 66 is turned on. The heater relay 63 continues to be in an unoperational condition. The cooler relay 67 is turned on and the fifth lamp 657 is energized to illuminate the second arrow display 559 in the "RECIRC" display 81 with blue light.

If the temperature of the engine cooling water is at or above the predetermined value and the temperature of the surface of the cooler core 7 is less than the predetermined value, the first and second temperature sensors 61 and 66 are turned on, and the movable arm 632 of the heater relay 63 and the movable arm 672 of the cooler relay 67 are brought into contact with the respective contacts a. Therefore, the fifth and thirteenth lamps 567 and 581 are energized to emit blue light and red light respectively and purple light which is a mixture of blue and red lights reaches the second arrow display 559, whereby the second arrow display 559 in the "RECIRC" display 81 is illuminated purple in relief.

Suppose that the temperature of the engine cooling water is at or above the predetermined value and the temperature of the surface of the cooler core 7 is less than the predetermined value. As the first and second temperature sensors 61 and 66 are turned on, the movable arm 632 of the heater relay 63 contacts with the contact a and the cooler relay 67 is closed.

In this case, when the knob 50 disposed on the end of the function lever 51 is moved to the "VENT" position B, the sixth brush 92 and the seventh brush 93 contact with the second electrode plate 97. Consequently, the fourth, sixth, and seventh lamps 566, 568 and 569 are energized. The blue light from the fourth lamp 566 reaches the display panel 541 through the first arrow display 558, whereby the first arrow display 558 in the "FRESH" display 80 is illuminated blue in relief. The blue-green light produced by the simultaneous energization of the sixth and seventh lamps 568 and 569 reaches the display panel 541 through the third arrow display 560, whereby the third arrow display 560 in the "VENT" display 82 is illuminated blue-green in relief.

When the knob 50 is moved to the position C between "VENT" and "HEAT", the sixth, seventh and eighth brushes 92, 93 and 94 contact with the second electrode plate 97. Consequently, the fourth, sixth, seventh, eighth and ninth lamps 566, 568, 569, 570 and 571 are energized. The first arrow display 558 in the "FRESH" display 80 is illuminated blue in relief, and the third arrow display 560 in the "VENT" display 82 is illuminated blue-green in relief. The purple light which is a mixture of the blue and red lights emitted from the eighth and ninth lamps 570 and 571 reaches the display panel 541 through the fourth arrow display 561, whereby the fourth arrow display 561 in the "HEAT" display 83 is illuminated purple and appears on the display panel 541 in relief.

When the knob 50 is moved to the position E between "HEAT" and "DEF", the sixth, eighth and ninth brushes 92, 94 and 95 contact with the second electrode plate 97. Consequently, the fourth, eithth, ninth, tenth and eleventh lamps 566, 570, 571, 572 and 573 are energized. The first arrow display 558 in the "FRESH" display 80 and the fourth arrow display 561 in the "HEAT" display 83 are illuminated blue and purple respectively and appear on the display panel 541 in relief. The purple light produced by the mixture of the lights from the tenth and eleventh lamps 572 and 573 passes through the fifth arrow display 562 and reaches the display panel 541, whereby the fifth arrow display 562 in the "DEF" display 84 is illuminated purple in relief.

The lighting modes of the first to fifth arrow displays 558 to 562 by the fourth to eleventh and thirteenth lamps 566 to 573 and 581 are shown in Table 7.

TABLE 7

| Operating Conditions | | | Displays Illuminated by Lamps | | | | |
|---|---|---|---|---|---|---|---|
| Position of Knob | First Temperature Sensor | Second Temperature Sensor | First Arrow Display (FRESH) | Second Arrow Display (RECIRC) | Third Arrow Display (VENT) | Fourth Arrow Display (HEAT) | Fifth Arrow Display (DEF) |
| RECIRC A | | OFF | — | L | — | — | — |
| | | ON | — | L | — | — | — |
| | | OFF | — | R | — | — | — |
| | ON | ON | — | L.R | — | — | — |
| VENT B | OFF | OFF | L | — | L | — | — |
| | | ON | L | — | L | — | — |
| | | OFF | L | — | G | — | — |
| | ON | ON | L | — | L.G | — | — |
| Position between VENT and HEAT C | OFF | OFF | L | — | L | L | — |
| | | ON | L | — | L | L | — |
| | ON | OFF | L | — | R | R | — |
| | | ON | L | — | L.R | L.R | — |
| HEAT D | OFF | OFF | L | — | — | L | — |
| | | ON | L | — | — | R | — |
| | ON | OFF | L | — | — | L.R | — |
| | | ON | L | — | — | L.R | — |
| Position between HEAT and DEF C | OFF | OFF | L | — | — | L | L |
| | | ON | L | — | — | L | L |
| | ON | OFF | L | — | — | R | R |
| | | ON | L | — | — | L.R | L.R |
| DEF F | OFF | OFF | L | — | — | — | L |
| | | ON | L | — | — | — | L |
| | ON | OFF | L | — | — | — | R |
| | | ON | L | — | — | — | L.R |

Remarks:
"—" indicates the lamp is not energized.
"L" indicates the lamp is energized and the display is illuminated blue.
"R" indicates the lamp is energized and the display is illuminated red.
"G" indicates the lamp is energized and the display is illuminated green.
"L.R" indicates the lamps are energized and the display is illuminated purple by mixture of blue and red.
"L.G" indicates the lamps are energized and the display is illuminated blue-green by mixture of blue and green.

Accordingly, depending on the position of the knob 50, the arrow displays 559 to 562 of the displays 81 to 84 change color depending on the temperature of the engine cooling water and the temperature of the surface of the cooler core. Therefore, by checking the colors, it is easy to determine whether the cooler and the heater are in a condition suitable for operation, and the occupants can avoid discomfort caused by turning on the fan switch 53 and discharging air which is not at the appropriate temperature when the cooler and the heater are not in an effective condition.

Figure 34:
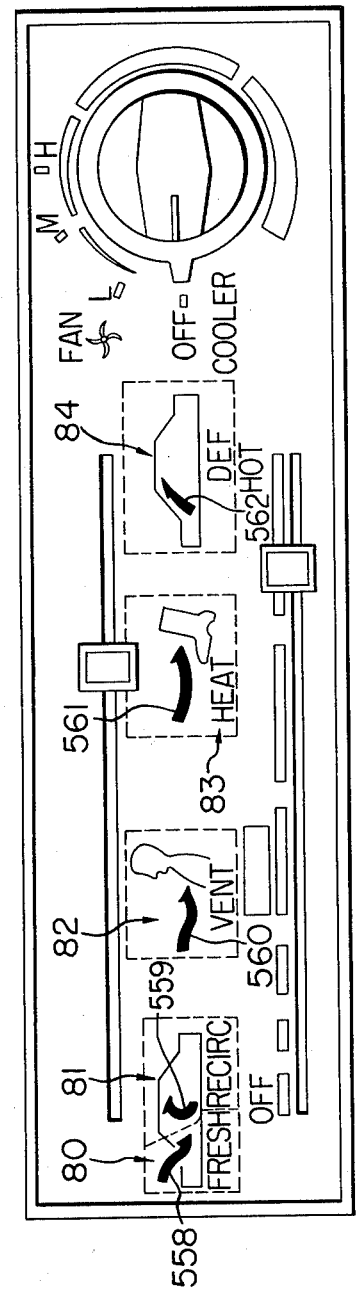
FIG. 34 is an enlarged front elevational view of a tenth embodiment of the present invention.

A tenth embodiment of the invention shown in FIG. 34, is a modification of the displays 80 to 84 in the ninth embodiment shown in FIG. 27.

Referring to FIG. 34, the "FRESH" display 80 comprises the pictorial display of the vehicle profile, the first arrow display 558 and the letters "FRESH". The arrow display 558 comprises a striplike arrow extending from the bonnet area of the pictorial display of the vehicle profile to the area of said pictorial display corresponding to the vehicle compartment and indicating flow of air into the vehicle compartment. The "RECIRC" display 81 comprises the pictorial display of the vehicle profile, the second arrow display 559 and the letters "RECIRC". The arrow display 559 comprises a strip-like arrow disposed on the vehicle compartment area of said pictorial display for indicating the recirculation of air within the vehicle compartment. The "VENT" display 82 comprises the pictorial display of the upper half of the human body, the third arrow display 560 and the letters "VENT". The arrow display 560 comprises a strip-like arrow extending toward the pictorial display of the human body and indicating flow of air toward the upper half of the bodies of the occupants. The "HEAT" display 83 comprises a pictorial display of a human leg, the fourth arrow display 561 and the letters "HEAT". The arrow display 561 comprises a strip-like arrow extending toward said pictorial display of the human leg and indicating flow of air toward the legs of the occupants. The "DEF" display 84 comprises a pictorial display of the vehicle profile, the fifth arrow display 562 and the letters "DEF". The arrow display comprises a strip-like arrow extending upward along the portion of said pictorial display corresponding to the vehicle front glass and indicating flow of air on the surface of the vehicle front glass.

Figure 35:
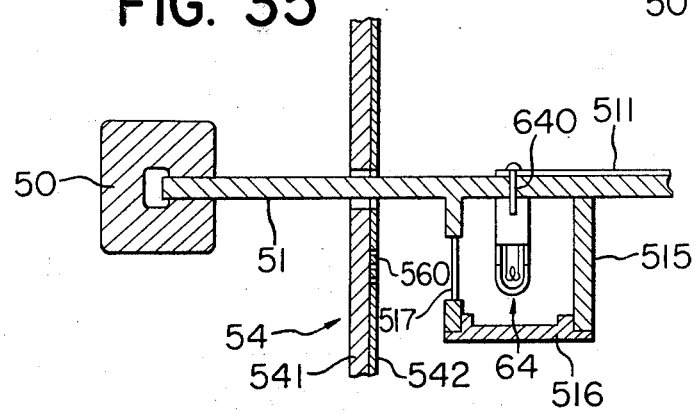
FIG. 35 is a sectional view of part of an air conditioner actuator associated with an eleventh embodiment of the present invention.

In an eleventh embodiment of the invention shown in FIG. 35, the "VENT" display 82, "HEAT" display 83 and "DEF" display 84 of the ninth embodiment are not illuminated by lamps behind the displays but by lamps disposed in the function lever 51, and the displays are illuminated depending on the position of the function lever 51. The same numerals are used for designating the components similar to those in the ninth embodiment.

Referring to FIG. 35, the function lever 51 has a box 515 in opaque material projecting downward behind the actuator panel 54 which is formed by the display panel 541 and the shielding plate 542. The lower opening of the box 515 is covered by an opaque cover 516. The box 515 in FIG. 35 has an opening at its left wall in FIG. 35. The opening is fitted with a diffusion plate 517 such as ground glass. The diffusion plate 517 is so arranged that a certain gap is created between the diffusion plate 517 and the shielding plate 542, and that when the diffusion plate 517 is behind the arrow display light from the diffusion plate reaches only this display, and when the diffusion plate 517 is positioned between two adjacent arrow displays light reaches said arrow displays. The first lamp 64 emitting red light and the second lamp 65 (not shown) emitting blue light are provided in the box 515. These first and second lamps 64 and 65 are connected with the power source by the circuit shown in FIG. 19 through the printed circuit boards. The printed circuit board 511 shown in FIG. 35 connects one lead of the first lamp 64 with the power source.

When, for example, the function lever 51 is moved to the "HEAT" position D and the heater lever 52 is in a position other than "OFF", and if the temperature of the engine cooling water is at or higher than the predetermined value, the first lamp 64 is energized and emits red light. This light reaches the display panel 541 from the diffusion plate 517 through the fourth arrow display 561 formed on the shielding plate 542, whereby the fourth arrow display 561 is displayed red on the display panel 541.

When the function lever 51 is moved to the position E between the "HEAT" position D and the "DEF" position F, since the red light from the first lamp 64 is diffused by the diffusion plate 517, the light reaches both the fourth arrow display 561 and the fifth arrow display 562 and both displays 561 and 562 are gloomily illuminated.

Figure 36:
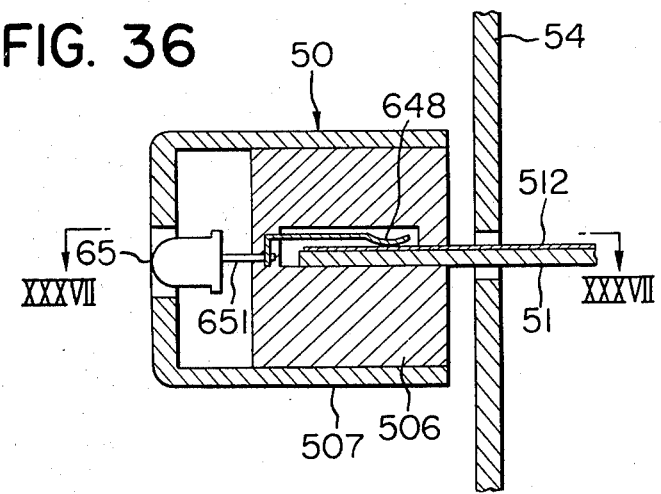
FIG. 36 is a sectional view of part of an air conditioner actuator associated with a twelfth embodiment of the present invention.
Figure 37:
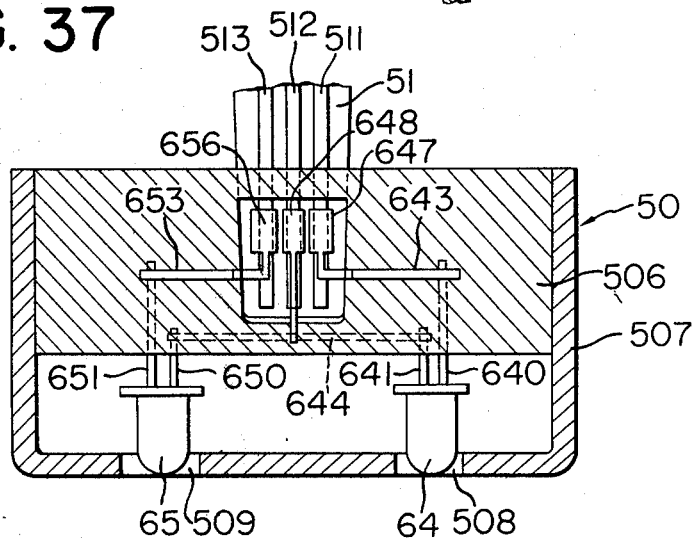
FIG. 37 is a sectional view taken along the line XXXVII—XXXVII in FIG. 36.
Figure 39:
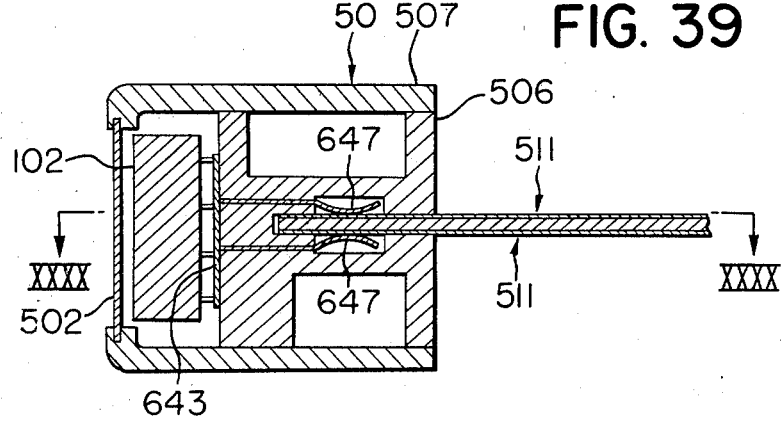
FIG. 39 is a sectional view taken along the line XXXIX—XXXIX in FIG. 38.
Figure 38:
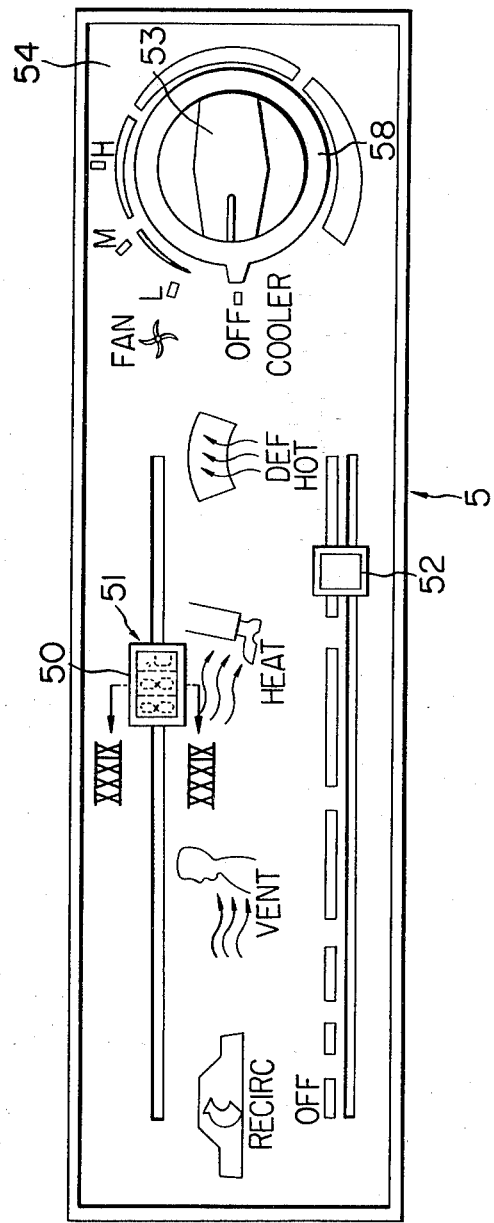
FIG. 38 is an enlarged front elevational view of a thirteenth embodiment of the present invention.
Figure 40:
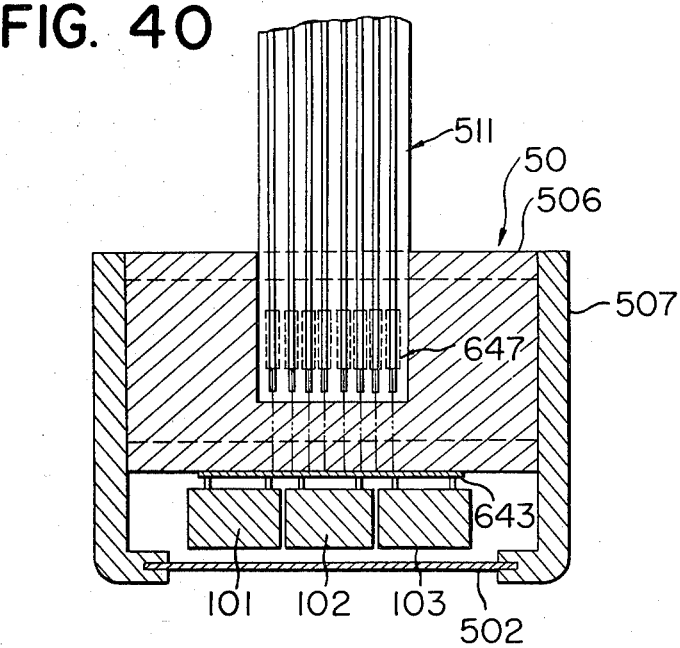
FIG. 40 is a sectional view taken along the line XXXX—XXXX in FIG. 39.

A twelfth embodiment shown in FIGS. 36 and 37 is a modification of the first embodiment. The same numerals are used for designating the components similar to those in the first embodiment.

Referring to FIGS. 36 and 37, the knob 50 comprises a body 506 and the cover 507. The body 506 is made of rubber, plastic or similar insulating material and is integrally provided with the leads 640 and 641 of the first lamp 64, the first and second conductive plates 643 and 644 connected with the leads 640 and 641, the first and second brushes 647 and 648 connected with the first and second conductive plates 643 and 644, the leads 650 and 651 of the second lamp 65, the third conductive plate 653 connected with the lead 651, and the third brush 656 connected with the third conductive plate 653. The lead 650 of the second lamp 65 is connected with the second conductive plate 644. The first to third brushes 647, 648 and 656 project into a cavity formed in the central portion of the body 506. The end of the function lever 51 is inserted into the cavity so that the first to third brushes 647, 648 and 656 contact with the first to third printed circuit boards 511 to 513 disposed on the upper surface of the function lever 51. The cover 507 is made of opaque material and is fixed to the body 506 so as to cover the body 506 and the first and second lamps 64 and 65. The cover 507 is provided on its front surface with holes 508 and 509 through which the ends of the first and second lamps 64 and 65 project. These first and second lamps 64 and 65 may be light emitting diodes.

In a thirteenth embodiment of the invention shown in FIGS. 38 to 42, the temperature of the engine cooling water or the temperature of the surface of the cooler is displayed on the front end of the knob. The same numerals are used for designating the components similar to those in the third embodiment.

Referring to FIGS. 38 to 42, the knob 50 on the end of the function lever 51 comprises the body 506 and the cover 507. A printed circuit board 643 with sixteen independent circuits is attached to the body 506. The printed circuit board 643 has, at one end, first and second light emitting diodes 101 and 102 and a third light emitting diode 103. Each of the first and second light emitting diodes 101 and 102 has seven segments, while third light emitting diode 103 has a "° C." shaped segment. The other end of the printed circuit board 643 has sixteen brushes 647 fitted thereto. The opaque cover 507 covers the first to third light emitting diodes 101 to 103 and the body 506 and is formed with a cut-out on its portion in front of the first to third light emitting diodes. The smoked panel 502 is fitted in the cut-out. The sixteen brushes 647 contact with the respective sixteen printed circuit boards 511, eight each of which are mounted on the top and bottom surfaces of the function lever 51.

Figure 41:
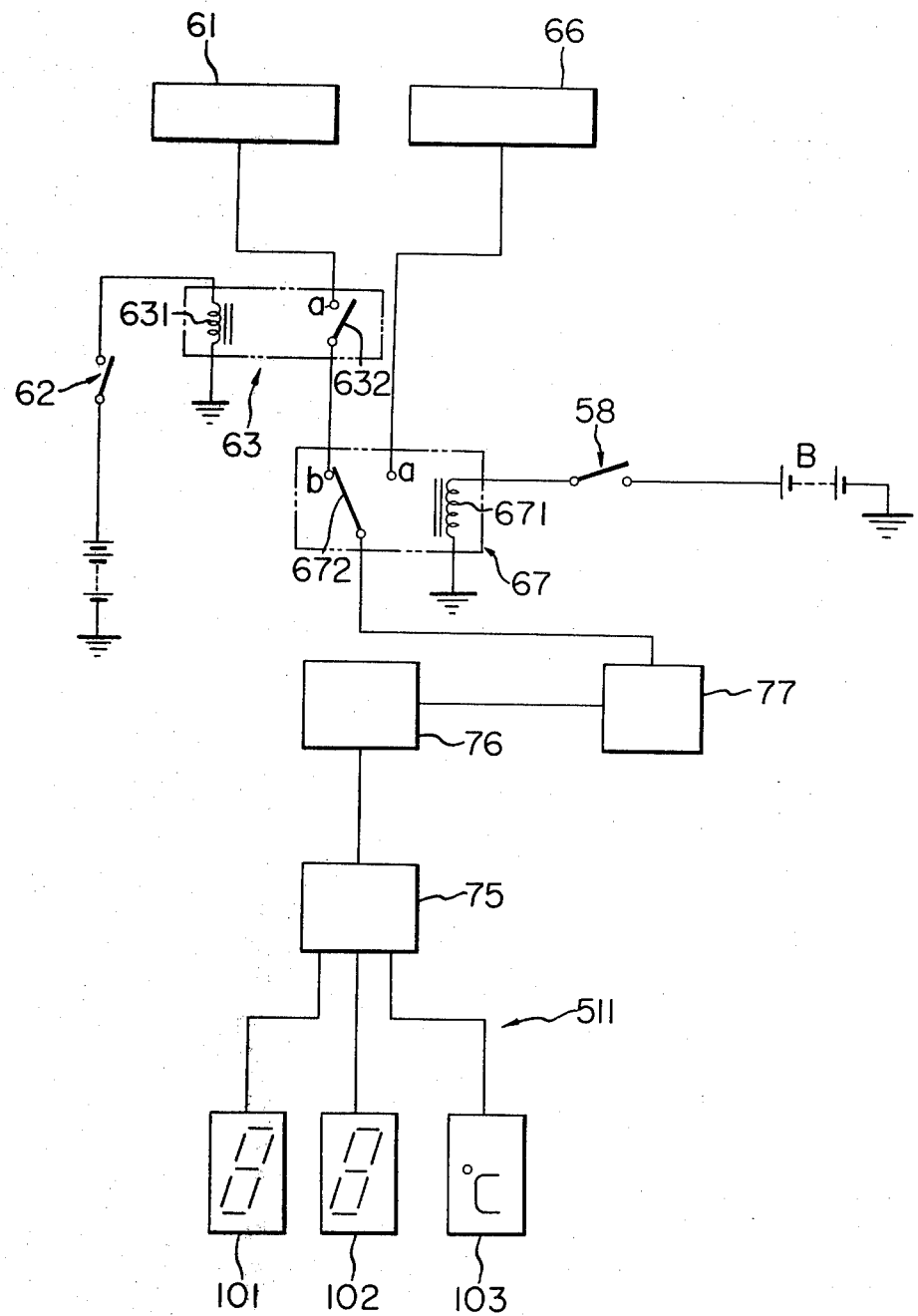
FIG. 41 is a circuit diagram of the thirteenth embodiment.
Figure 42:
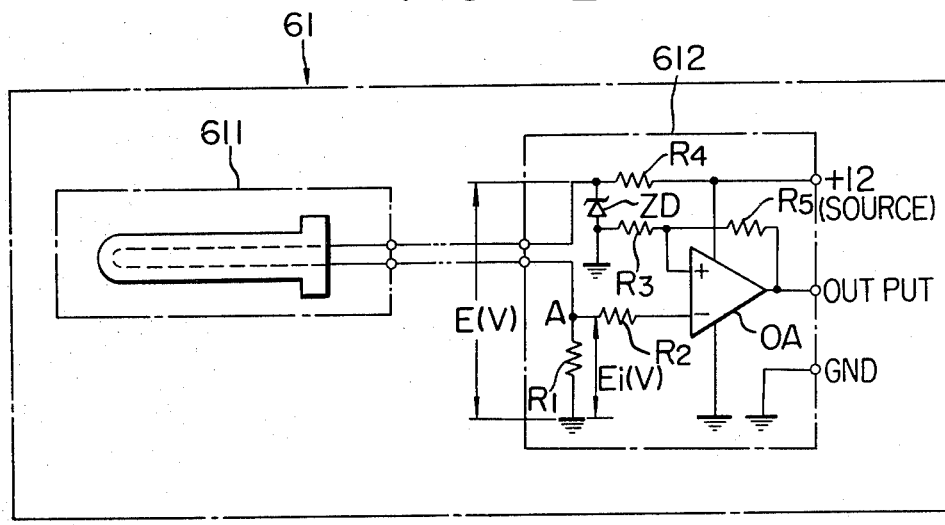
FIG. 42 is a circuit diagram of a first temperature sensor in FIG. 41.

As shown in FIG. 41, the printed circuit boards 511 are connected with the light emitting diode energizing circuit 75 which is in turn connected with the movable arm 672 of the cooler relay 67 through a digital processing circuit 76 and an analogue-digital converter 77. The exciting coil 671 of the cooler relay 67 is connected with the battery B through the cooler switch 58. The contact a of the cooler relay 67 is connected with the second temperature sensor 66 and contacts with the movable arm 672 when the exciting coil 671 is energized. The contact b is connected with the movable arm 632 of the heater relay 63. The exciting coil 631 of the heater relay 63 is connected with the heater switch 62 and the stationary contact a is connected to the first temperature sensor 61. The first temperature sensor 61 comprises a thermistor 611 disposed in the engine cooling water passageway and an amplifier 612. The thermistor 611 reduces resistance when the temperature of the cooling water increases. The amplifier 612 comprises resistors $R_1$ to $R_5$, Zener dioe ZD and an operational amplifier OA and amplifies the voltage $E_i$ at A to generate an output. The second temperature sensor 66 is constituted same as the first temperature sensor 61.

In the above embodiment, if the heater lever 52 is in the "OFF" position and the heater switch 58 is turned off, the stationary contact a of the heater relay 63 is opened and the movable arm 672 of the cooler relay 67 contacts with the contact b. Since the contact a is open, the first to third light emitting diodes 101 to 103 are not energized.

When the heater lever 52 is moved from the "OFF" position toward the "HOT" position and the heater switch is turned on, the movable arm 632 is brought into contact with the contact a by energization of the exciting coil 631 of the heater relay 63. The first temperature sensor 61 sends an output voltage corresponding to the temperature of the engine cooling water to the analogue-digital converter 77 through the heater relay 63 and the cooler relay 67. The voltage is converted into a digital signal by the converter 77. The digital signal is converted into a signal for displaying figures by the digital processing circuit 76. This converted signal is sent to the light emitting diode energizing circuit 75 which generates an output. The first and second light emitting diodes 101 and 102 are energized by the output of the light emitting diode energizing circuit 75 and the figures corresponding to the temperature of the engine cooling water are displayed. At the same time, the light emitting dioe energizing circuit 75 is operated by the output of the diginal processing circuit 76 to energize the third light emitting diode 103 and the display "° C." is displayed, whereby the temperature is displayed on the smoked panel 502.

Then, when the cooler switch 58 is turned on, the exciting coil 671 of the cooler relay 67 is energized and the movable arm 672 contacts with the contact a. The temperature of the surface of the cooler core 7 is sensed by the second temperature sensor 66. Consequently, the figures corresponding to said temperature are displayed on the smoked panel 502 through the energization of the first and second light emitting diodes.

Therefore, the occupants can easily determine whether or not the heater or the cooler is operational and can turn the fan switch 53 on and off accordingly. Thus, the occupants can avoid discomfort resulting from turning the fan switch 53 on and discharging air of an unsuitable temperature from the outlets when the heater or cooler is not in an operational condition.

In the thirteenth embodiment described above, the first to third light emitting diodes 101 to 103 are disposed in the knob 50, but the same results can be obtained by disposing the light emitting diodes in the knob of the heater lever 52 or the actuator panel 54.

Figure 44:
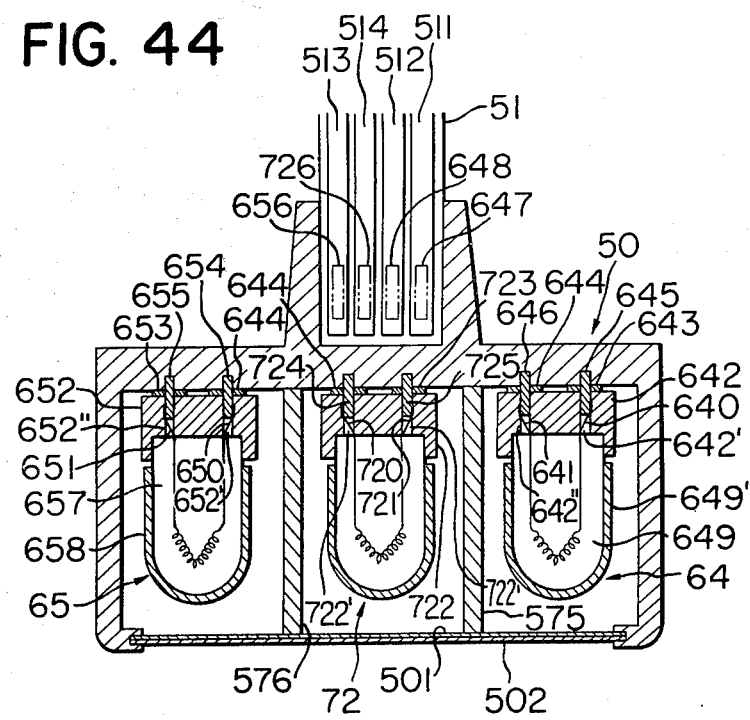
FIG. 44 is a sectional view of part of an air conditioner actuator associated with the fourteenth embodiment.
Figure 43:
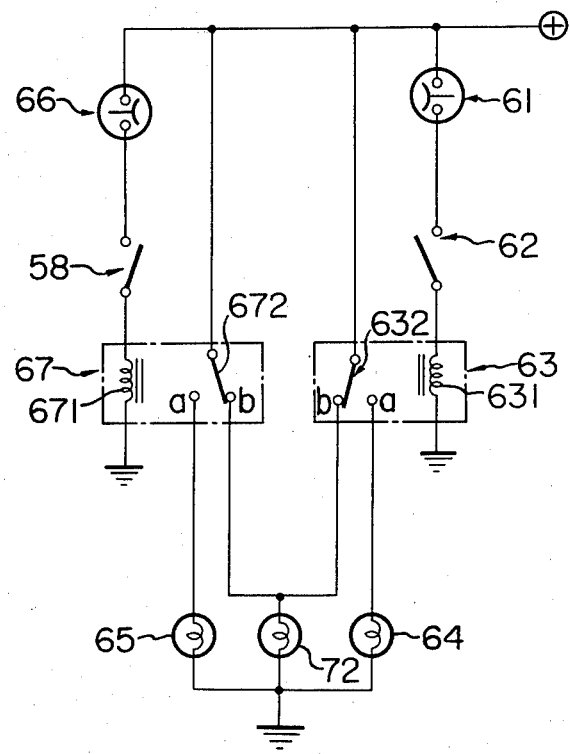
FIG. 43 is a circuit diagram of a fourteenth embodiment of the present invention.

A fourteenth embodiment of the invention shown in FIGS. 43 and 44 is a modification of the circuits shown in the seventh embodiment. The movable arm 632 of the heater relay 63 is connected with the power source and the contact b of the cooler relay 67 is connected with the third lamp 72. A first partition plate 575 of opaque material is disposed between the first lamp 64 and the third lamp 72 in the knob 50, and a second partition plate 576 of opaque material is disposed between the third lamp 72 and the second lamp 65.

The lighting modes of the first to third lamps 64, 65 and 72 are as shown in Table 8.

TABLE 8

| Operating Conditions | | | | Lamp | | |
|---|---|---|---|---|---|---|
| Heater Switch | Cooler Switch | First Temperature Sensor | Second Temperature Sensor | First Lamp Red | Second Lamp Blue | Third Lamp Green |
| OFF | OFF | OFF | OFF | X | X | O |
| | | | ON | X | X | O |
| | | ON | OFF | X | X | O |
| | | | ON | X | X | O |
| | ON | OFF | OFF | X | X | O |
| | | | ON | X | O | O |
| | | ON | OFF | X | X | O |
| | | | ON | X | X | O |
| ON | OFF | OFF | OFF | O | X | O |
| | | | ON | O | X | O |
| | | ON | OFF | X | X | O |
| | | | ON | X | O | O |
| | ON | OFF | OFF | O | X | O |
| | | | ON | O | O | X |

Remarks:
"X" indicates the lamp is not energized.
"O" indicates the lamp is energized.

What is claimed is:

1. An air conditioning display system for a vehicle comprising a vehicle's air conditioner proper including at least a plurality of air intake ducts, a plurality of air discharge ducts, a plurality of dampers disposed in said ducts for closing and opening said ducts, a fan unit, and a heat exchanger, air conditioner actuating means for actuating at least said dampers and said fan unit in said air conditioner proper and controlling supply of heat medium to said heat exchanger, and a display device including at least temperature sensing means for sensing a temperature at said heat exchanger, and display means for providing display corresponding to the temperature at said heat exchanger in response to a signal from said temperature sensing means;

said display means energizing lighting means to provide the temperature display; and said display means is disposed in a knob located at one end of a function lever provided in said air conditioning actuating means for moving said dampers.

2. An air conditioning display system as claimed in claim 1, wherein said lighting means is disposed in said knob, and said display means includes a diffusion plate fitted in an opening in said knob adjacent to the forward portion of said lighting means.

3. An air conditioning display system as claimed in claim 2, wherein a smoked panel is attached on said diffusion plate.

4. An air conditioning display system as claimed in claim 1, wherein said heat exchanger is composed of a heater core supplied with hot water, and said display means energizes said lighting means when a temperature of hot water is above a predetermined value, thereby providing the temperature display for representing that hot water is warm enough.

5. An air conditioning display system as claimed in claim 4, wherein said heater core is supplied with engine cooling water.

6. An air conditioning display system as claimed in claim 5, wherein said temperature sensing means is disposed in a passage for the engine cooling water.

7. An air conditioning display system as claimed in claim 5, wherein said temperature sensing means is disposed on a surface of said heater core.

8. An air conditioning display system as claimed in claim 1, wherein said heat exchanger is composed of a cooler core supplied with refrigerant, and said temperature sensing means is disposed in said cooler core and energizes said lighting means when a temperature at said cooler core is below a predetermined value.

9. An air conditioning display system as claimed in claim 1, wherein said heat exchanger is composed of a heater core, and said display device includes a heater relay having an exciting coil connected with said temperature sensing means which is turned on when the temperature at said heater core is above a predetermined value, first lighting means emitting light of warm color and connected with a first contact of said heater relay, and second lighting means emitting light of cold color and connected with a second contact of said heater relay, a movable arm of said heater relay being brought into contact with said first and second contacts when said exciting coil is energized and deenergized respectively.

10. An air conditioning display system as claimed in claim 9, wherein said display device includes a heater switch turned on when a heater lever provided in said air conditioner actuating means is manipulated to substantially supply engine cooling water to said heater core, said heater switch and said temperature sensing means being connected in series with said exciting coil of the heater relay.

11. An air conditioning display system as claimed in claim 9, wherein said temperature sensing means is composed of a thermal reed switch.

12. An air conditioning display system as claimed in claim 1, wherein said air conditioner proper includes a heater core supplied with engine cooling water, and a cooler core supplied with refrigerant, and said display device includes first temperature sensing means turned on when a temperature at said heater core is above a predetermined value, a heater switch turned on when a heater lever provided in said air conditioner actuating means is manipulated to substantially supply the engine cooling water to said heater core, a heater relay having an exciting coil connected in series with said first temperature sensing means and said heater switch, first lighting means emitting light of warm color and connected with a stationary contact of said heater relay, second temperature sensing means turned on when a temperature at the surface of said cooler core is below a predetermined value, a cooler switch for operating a cooler unit to supply the refrigerant to said cooler core, a cooler relay having an exciting coil connected in series with said second temperature sensing means and said cooler switch, and second lighting means emitting light of cold color and connected with a first contact of said cooler relay, a second contact of said cooler relay being connected with a movable arm of said heater relay, said movable arm of said heater relay being brought into contact with said stationary contact thereof when the exciting coil of said heater relay is energized, a movable arm of said cooler relay being brought into contact with said first and second contacts thereof when the exciting coil of said cooler relay is energized and deenergized respectively.

13. An air conditioning display system as claimed in claim 1, wherein said air conditioner proper includes a heater core supplied with engine cooling water, and a cooler core supplied with refrigerant, and said display device includes first temperature sensing means turned on when a temperature at said heater core is above a predetermined value, a heater relay having an exciting coil connected with said first temperature sensing means, first lighting means emitting light of warm color and connected with a first contact of said heater relay, second lighting means emitting light of cold color and connected with a second contact of said heater relay, and second temperature sensing means turned on when a temperature at the surface of said cooler core is below a predetermined value and connected substantially with said second lighting means in parallel with said second contact, a movable arm of said heater relay being brought into contact with said first and second contacts to energize said first and second lighting means when said exciting coil of said heater relay is energized and deenergized respectively, said first and second lighting means being energized when said first and second temperature sensing means are turned on.

14. An air conditioning display system as claimed in claim 13, wherein said display device further includes a cooler relay having an exciting coil connected with said second temperature sensing means, a stationary contact of said cooler relay being connected with said second lighting means, a movable arm of said cooler relay being brought into contact with said stationary contact to energize said second lighting means when said second temperature sensing means is turned on.

15. An air conditioning display system as claimed in claim 14, wherein said display device further includes a heater switch turned on when a heater lever provided in said air conditioner actuating means is manipulated to substantially supply the engine cooling water to said heater core, and a cooler switch for operating a cooler unit to supply the refrigerant to said cooler core, said heater switch and said first temperature sensing means being connected in series with said exciting coil of said heater relay, said cooler switch and said second temperature sensing means being connected in series with said exciting coil of said cooler relay.

16. An air conditioning display system as claimed in claim 1, wherein said air conditioner proper includes a heater core supplied with engine cooling water, and a cooler core supplied with refrigerant, and said display device includes first temperature sensing means turned on when a temperature at said heater core is above a predetermined value, first lighting means emitting light of warm color and connected substantially with said first temperature sensing means, second temperature sensing means turned on when a temperature at the surface of said cooler core is below a predetermined value, and second lighting means emitting light of cold color and connected substantially with said second temperature sensing means.

17. An air conditioning display system as claimed in claim 16, wherein said display device further includes a heater switch turned on when a heater lever provided in said air conditioner actuating means is manipulated to substantially supply the engine cooling water to said heater core, a heater relay having an exciting coil connected in series with said heater switch and said first temperature sensing means, a cooler switch for operating a cooler unit to supply the refrigerant to said cooler core, and a cooler relay having an exciting coil connected in series with said cooler and said second temperature sensing means, said first lighting means being connected with a stationary contact of said heater relay, said second lighting means being connected with a stationary contact of said cooler relay, movable arms of said heater and cooler relays being brought into contact with the stationary contacts thereof to energize said first and second lighting means when the exciting coils of said relays are energized respectively.

18. An air conditioning display system as claimed in claim 16, wherein said first and second lighting means are separated by a partitioning member so as to prevent light from passing between said lighting means.

19. An air conditioning display system as claimed in claim 1, wherein said air conditioner proper includes a heater core supplied with engine cooling water, and a cooler core supplied with refrigerant, and said display device includes a heater switch turned on when a heater lever provided in said air conditioner actuating means is manipulated to substantially supply the engine cooling water to said heater core, first temperature sensing means connected with said heater switch and turned on when a temperature at said heater core is above a predetermined value, a cooler switch for operating a cooler unit to supply the refrigerant to said cooler core, second temperature sensing means connected with said cooler switch and turned on when a temperature at the surface of said cooler core is below a predetermined value, a first heater relay connected with said first temperature sensing means, a second heater relay connected with said heater switch, a first cooler relay connected with said second temperature sensing means, a second cooler relay connected with said cooler switch, first lighting means emitting light of warm color and connected with said first heater relay and said second cooler relay, second lighting means emitting light of cold color and connected with said first cooler relay and said second heater relay, and switching relays connected with said first and second lighting means, said switching relays being opened to deenergize said first and second lighting means when said heater switch and said cooler switch are turned on and said first and second temperature sensing means are turned off, said second heater relay being closed to energized said second lighting means when said heater switch is turned on and said cooler switch and said first and second temperature sensing means are turned off, said second cooler relay being closed to energize said first lighting means when said cooler switch is turned on and said heater switch and said first and second temperature sensing means are turned off, said first heater relay and said first cooler relay being closed to energized said first and second lighting means when said heater switch, said cooler switch and said first and second temperature sensing means are turned on.

20. An air conditioning display system as claimed in claim 19, wherein said first heater relay includes an exciting coil connected with said heater switch through said first temperature sensing means, a first switch and a second switch, said first switch having a movable are connected with a power source, a first contact connected with said first lighting means and a second contact, said second switch having a movable arm connected with said power source and a stationary contact connected with an exciting coil of said first switching relay, said second heater relay including an exciting coil connected with said heater switch, a movable arm connected with said second contact of said first switch and a stationary contact connected with said second lighting means, said first cooler relay including an exciting coil connected with a first switch portion of said cooler switch of double switch structure through said second temperature sensing means, a first switch and a second switch, said first switch of said first cooler relay having a movable arm connected with said power source, a first contact connected with said second lighting means and a second contact, said second switch of said first cooler relay having a movable arm connected with said power source and a stationary contact connected with the exciting coil of said first switching relay, said second cooler relay including an exciting coil connected with said first switch portion of said cooler switch, a movable arm connected with said second contact of said first switch of said first cooler relay and a stationary contact connected with said first lighting means, said first switching relay including a movable arm connected with said first and second lighting means and a stationary contact connected with ground, said second switching relay including an exciting coil connected with said heater switch through a second portion of said cooler switch, a movable arm connected with said first and second lighting means and a stationary contact connected with ground, said movable arms of said first switches of said first heater and cooler relays being brought into contact with the corresponding first and second contacts and said second switches being turned on and off when said exciting coils of said relays are energized and deenergized respectively, said movable arms of said second heater and cooler relays and said first switching relay being brought into contact with the corresponding stationary contacts when said exciting coils of said relays are energized, said movable arm of said second switching relay being brought out of contact with said stationary contact thereof when said exciting coil of said relay is energized.

21. An air conditioning display system as claimed in claim 1, wherein said air conditioner proper includes a heater core supplied with engine cooling water, and a cooler core supplied with refrigerant, and said display device includes first temperature sensing means turned on when a temperature at said heater core is above a predetermined value, a heater relay having an exciting coil connected with said first temperature sensing means, first lighting means emitting light of warm color and connected with a first contact of said heater relay, second temperature sensing means turned on when a temperature at the surface of said cooler core is below a predetermined value, a cooler relay having an exciting coil connected with said second temperature sensing means, second lighting means emitting light of cold color and connected with said cooler relay, and third lighting means emitting light of color between warm color and cold color and connected with a second contact of said heater relay, a movable arm of said heater relay being brought into contact with said first and second contacts when said exciting coil of said heater relay is energized and deenergized respectively.

22. An air conditioning display system as claimed in claim 21, wherein said cooler relay includes a movable arm connected with a power source, a first contact connected with said second lighting means and a second contact connected with said movable arm of said heater relay.

23. An air conditioning display system as claimed in claim 21, wherein said movable arm of said heater relay is connected with a power source, and said cooler relay includes a movable arm connected with said power source, a first contact connected with said second lighting means and a second contact connected with said third lighting means, said movable arm of said cooler relay being brought into contact with said first and second contacts when said exciting coil of said cooler relay is energized and deenergized respectively.

24. An air conditioning display system as claimed in claim 23, wherein said first, second and third lighting means are separated by partitioning members so as to prevent light from passing between said lighting means.

25. An air conditioning display system as claimed in claim 1, wherein said lighting means is a luminous element covered with a transparent cap of desired color.

26. An air conditioning display system as claimed in claim 1, wherein said lighting means is connected with a printed circuit board formed on the surface of said lever through a brush.

* * * * *